United States Patent [19]

Takahashi et al.

[11] Patent Number: 5,592,624
[45] Date of Patent: Jan. 7, 1997

[54] DATA COMMUNICATION FOR CONTROLLING MESSAGE TRANSMISSION AND RECEPTION AMONG PROCESSING MODULES USING INFORMATION STORED IN DESCRIPTOR TO FORM A LOOSELY COUPLED MULTIPROCESSING SYSTEM

[75] Inventors: Hajime Takahashi; Hirohide Sugahara; Akira Kabemoto, all of Kawasaki, Japan

[73] Assignee: Fujitsu Limited, Kawasaki, Japan

[21] Appl. No.: 859,318

[22] PCT Filed: Sep. 27, 1991

[86] PCT No.: PCT/JP91/01306

§ 371 Date: May 28, 1992

§ 102(e) Date: May 28, 1992

[87] PCT Pub. No.: WO92/06430

PCT Pub. Date: Apr. 16, 1992

[30] Foreign Application Priority Data

Sep. 28, 1990 [JP] Japan ................... 2-259391

[51] Int. Cl.⁶ ............................. G06F 13/00; G06F 13/14
[52] U.S. Cl. ................... 395/200.07; 395/200.16; 395/853; 395/872; 364/228.8; 364/230; 364/DIG. 1
[58] Field of Search ................... 395/200, 250, 395/275, 200.07, 200.16, 853, 872; 370/94; 364/200

[56] References Cited

U.S. PATENT DOCUMENTS

| | | | |
|---|---|---|---|
| 4,449,182 | 5/1984 | Rubinson et al. | 364/200 |
| 4,601,586 | 7/1986 | Bahr et al. | 370/94 |
| 4,704,717 | 11/1987 | King, Jr. | 370/94 |
| 4,851,988 | 7/1989 | Trottier et al. | 395/200 |
| 4,866,664 | 9/1989 | Burkhardt, Jr. et al. | 364/900 |
| 5,047,917 | 9/1991 | Athas et al. | 364/200 |
| 5,142,683 | 8/1992 | Burkhardt, Jr. et al. | 395/725 |
| 5,212,778 | 5/1993 | Dally et al. | 395/400 |

FOREIGN PATENT DOCUMENTS

| | | |
|---|---|---|
| 13500/83 | 1/1988 | Australia . |
| 55-37642 | 3/1980 | Japan . |
| 55-157025 | 12/1980 | Japan . |
| 57-8828 | 1/1982 | Japan . |
| 59-178049 | 10/1984 | Japan . |
| 61-183762 | 8/1986 | Japan . |
| 1-216651 | 8/1989 | Japan . |

*Primary Examiner*—Thomas C. Lee
*Assistant Examiner*—Le Hien Luu
*Attorney, Agent, or Firm*—Staas & Halsey

[57] ABSTRACT

A message control system for a data communication system in the form of a loosely coupled multiprocessing system, in which a plurality of processing modules having a memory unit are coupled to each other via a system bus. In this message control system, a memory unit, within each processing module, includes a data processing part which is in software running on a central processing unit within its own processing module, a descriptor which manages address and data length information of a storage region for a message in the form of a chain, and a buffer which decomposes and stores a transmitting message. A connection unit within each processing module includes logical transmitting ports and a logical receiving port.

15 Claims, 20 Drawing Sheets

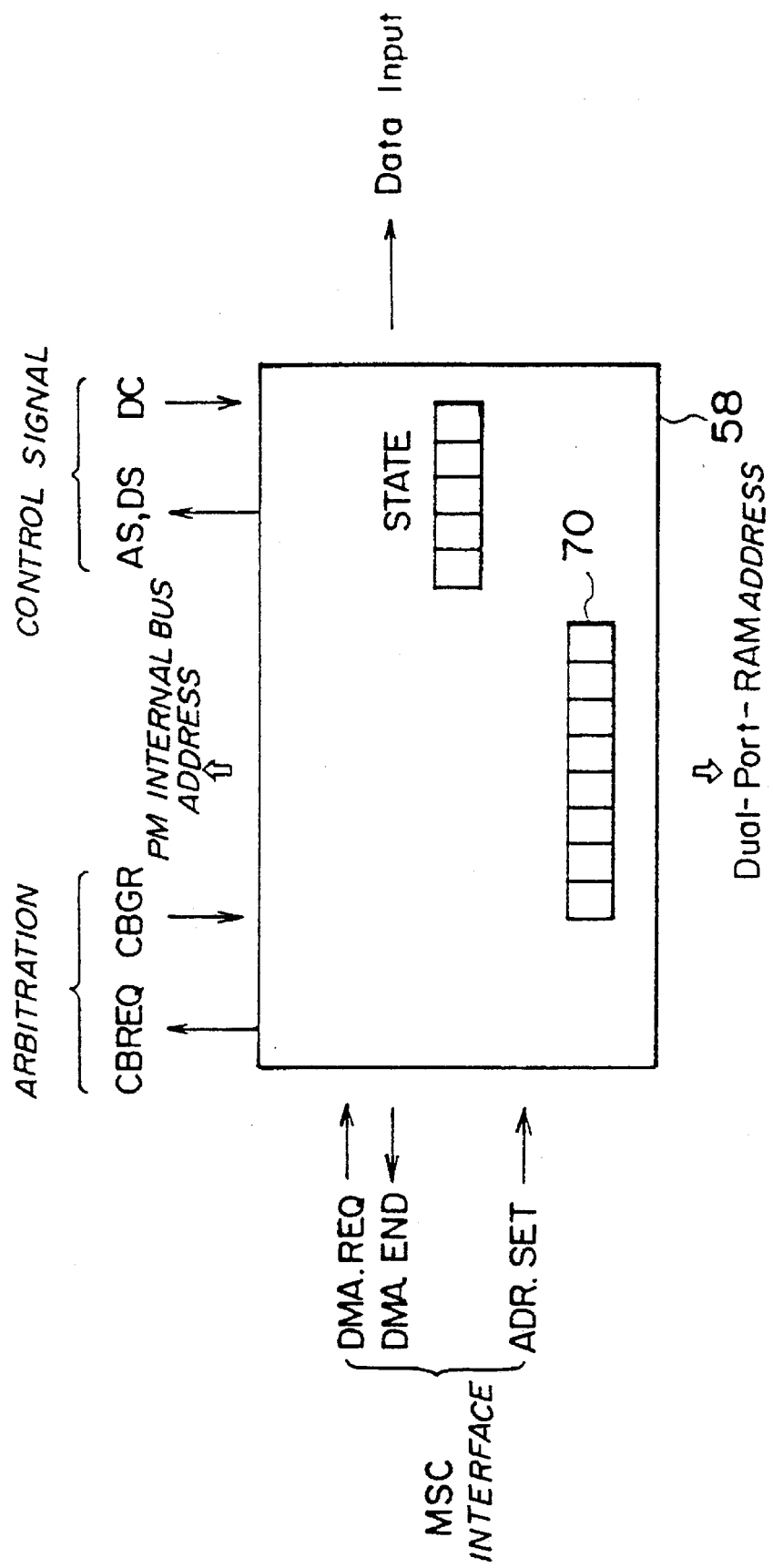

FIG. 12

| 0 . . . . . . 8 . . . . . . 16 . . . . . 24 . . . . . 31 | |
|---|---|
| D S A  \| 0\|0\|0\|0 | SPDSA |
| M\|M | SPODF |
| I\|N | SPFCP |
| C D S A  \| STATE | SPOPS |
| C S C | SPCST |

FIG. 13

| 0 . . . . . . 8 . . . . . . 16 . . . . . 24 . . . . . 31 | |
|---|---|
| D S A  \| 0\|0\|0\|0 | RPDSA |
| M\|M | RPODF |
| I\|N | RPFCP |
| C D S A  \| STATE | RPOPS |
| C S C | RPCST |
| S I D | RPSSI |

DATA COMMUNICATION FOR CONTROLLING MESSAGE TRANSMISSION AND RECEPTION AMONG PROCESSING MODULES USING INFORMATION STORED IN DESCRIPTOR TO FORM A LOOSELY COUPLED MULTIPROCESSING SYSTEM

TECHNICAL FIELD

The present invention generally relates to message control systems for data communication systems, and more particularly, to a system for controlling messages among a plurality of processing modules which form a loosely coupled multiprocessing (LCMP) system.

In data communication systems, one of the most important factors is to realize a reliable system having a large processing capability. In order to satisfy this demand, multiprocessor systems are being used. One system configuration of the multiprocessor system is the loosely coupled multiprocessing (LCMP) system in which a plurality of independent computers are coupled by channel-to-channel adapters, and the like, to enable a job input and execution by any of the computers.

When implementing message communication in the loosely coupled multiprocessing system, it is necessary to realize a message communication system which is transmitting side initiated, and can appropriately cope with the various control end requests issued during the communication by the data processing function. In addition, it is necessary to realize a message control system which can simply set and release logical connections.

BACKGROUND ART

Data communication systems having a microprocessor structure, with a tightly coupled multiprocessing (TCMP) system having a system configuration in which a plurality of microprocessors share a single memory device have been widely used. However, the loosely coupled multiprocessing system in which each processor has its own memory device is more popularly used in order to improve the system performance when increasing the number of processor modules.

In a loosely coupled multiprocessing system, general purpose buffers, having the same construction, are used for the buffers on the transmitting side and the receiving side as message storage regions, and the message transfer is made between these general purpose buffers.

However, when making message communication using such general purpose buffers, the message which is the subject of the communication cannot be stored in the general purpose buffer if the size of this message is large, and for this reason, it is necessary to communicate the message in divisions.

When executing the message communication according to this method, the message which is the subject of the transmission must, at the transmitting side processing module, be expanded to the general purpose buffer from the original memory position. In addition, at the receiving side processing module, it is necessary to expand the message which is received at the general purpose buffer to the requested memory position. For this reason, it takes too much time for the message transmission and reception process if the size of the message is large.

Therefore, a conventional message control system for the loosely coupled multiprocessing system has a problem in that it is impossible to promptly execute data processing which requires large messages to be transmitted and received.

The present invention takes the above noted problems into consideration, and has as an object to provide a message control system for a data communication system employing loosely coupled processing modules, which eliminates the above noted problems by making it possible to execute message communication without requiring the structures of the transmitting and receiving buffers to match.

DISCLOSURE OF THE INVENTION

In order to achieve the above object, the present invention provides a message control system for a data communication system, which employs a loosely coupled multiprocessing system structure, in which a plurality of processing modules having a central processing unit, a memory unit and a connection unit are connected to each other via a system bus. The memory unit of each processing module includes a data processing part which is software running on the central processing unit, a descriptor which manages address and processing unit, a descriptor which manages address and data length information of a message storage region in the form of a chain, and a buffer which forms the storage region in which a transmitting message is expanded and stored. The connection unit includes at least a logical transmitting port and a logical receiving port.

The logical transmitting port successively reads out from the buffer, based on the information of the descriptor, to transmit the message as a continuous message. The logical receiving port receives the message and stores the received message in the buffer in sequence.

According to the present invention, it is possible to store the message in the buffer in a form suited for each individual processing module by generating the descriptor, without being restricted by the size of the buffer which is used for the message transmission and reception. For this reason, it is possible to communicate a large amount of messages at one time with a small overhead. Accordingly, the present invention can promptly execute data processing which requires a large amount of message transmission and reception.

In addition, the present invention includes in the connection unit an abnormality detector for detecting whether or not an abnormality exists, with respect to the transmitted message when the logical receiving port completes the message reception, by detecting whether or not the amount of message received up to that point matches the message length which is indicated from the transmitting side processing module.

According to the present invention, when the abnormality exists in the transmitting side processing module or on the system bus, the abnormality detection can be made in the receiving side processing module, and thus, it is possible to prevent undesirable effects in the receiving side processing module due to the generation of the abnormality.

BRIEF DESCRIPTION OF THE DRAWINGS

FIG. 8 is a diagram of input and output signals of a memory access control unit;

FIG. 12 is a diagram showing an example of data written in a control register of a logical transmitting port;

FIG. 13 is a diagram showing an example of data written in a control register of a logical receiving port;

BEST MODE OF CARRYING OUT THE INVENTION

Figure 1:
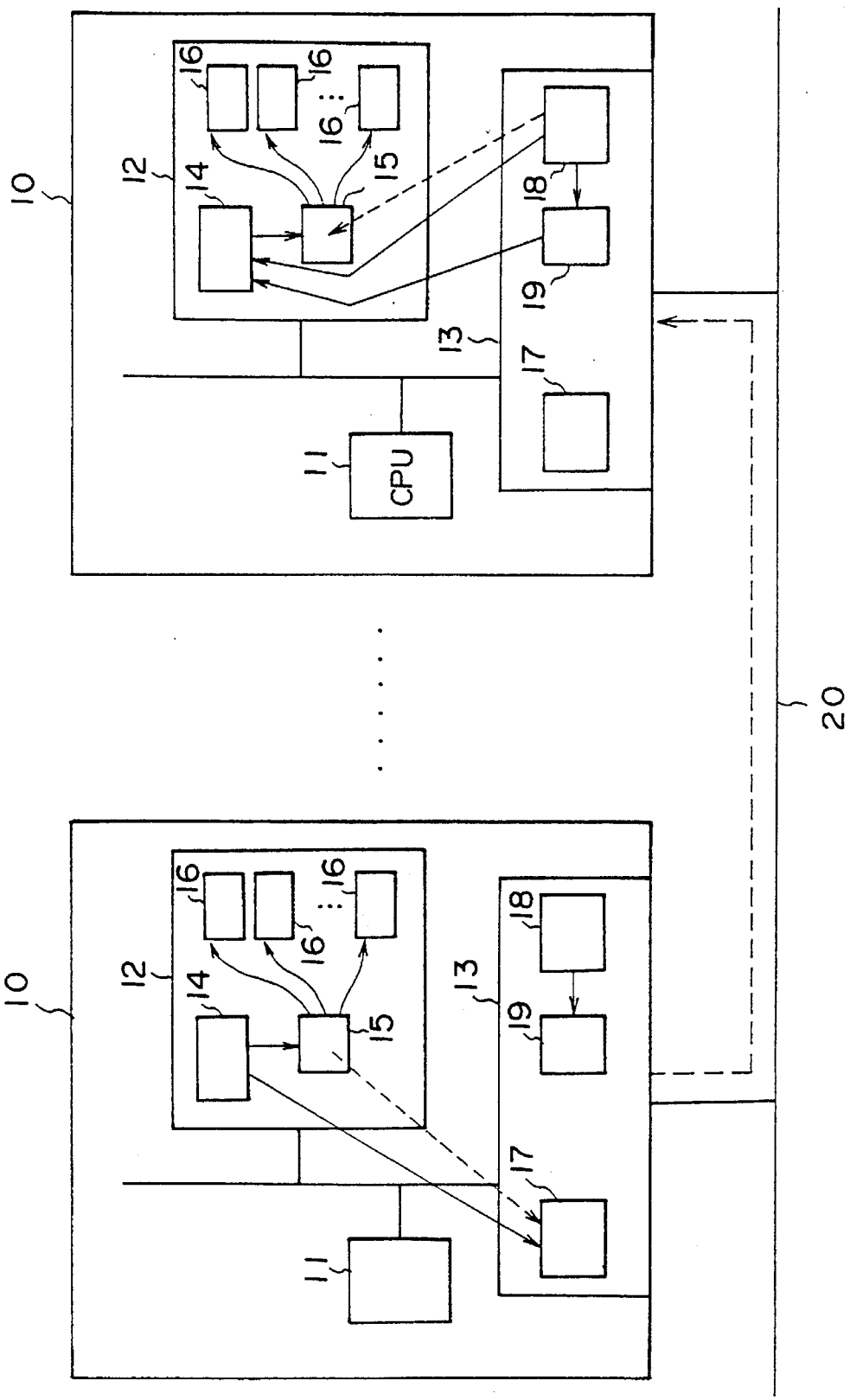
FIG. 1 is a block diagram of the present invention.

In FIG. 1, which is the block diagram of the principle of the present invention, a plurality of processing modules 10 are connected to each other via a system bus 20 and form a loosely coupled multiprocessing system. FIG. 1 shows a case where the message is transferred from the processing module 10 on the left hand side to the processing module 10 on the right hand side. Each processing module 10 includes a central processing unit 11, a memory unit 12 which is only accessible by this central processing unit 11, and a connection unit 13 which is provided to manage communication processes with other processing modules 10.

The memory unit 12 includes a data processing unit 14, a descriptor 15, an arbitrary form buffer 16 and the like.

The data processing part 14 is formed by software which is expanded in the memory unit 12 and runs on the central processing unit 11. The data processing part 14 carries out a predetermined data processing function depending on data information which is exchanged by the message communication system between other processing modules 10. The descriptor 15 manages the arrangement address and the data length information of the arbitrary form buffer 16 in the form of a chain.

The connection unit 13 includes at least one logical transmitting port 17, at least one logical receiving port 18, an abnormality detecting means 19 and the like. The logical transmitting port 17 is provided as a communication port for the data processing part 14 and successively reads out the message expanded in the memory unit 12 to transmit the same to the receiving side of a processing module 10. The logical receiving port 18 receives the message transmitted from other processing modules 10 and stores the received message in the memory unit 12. The abnormality detecting means 19 detects whether or not an abnormality is generated in the message communication depending on the size of message received at the logical receiving port 18.

Figure 2:
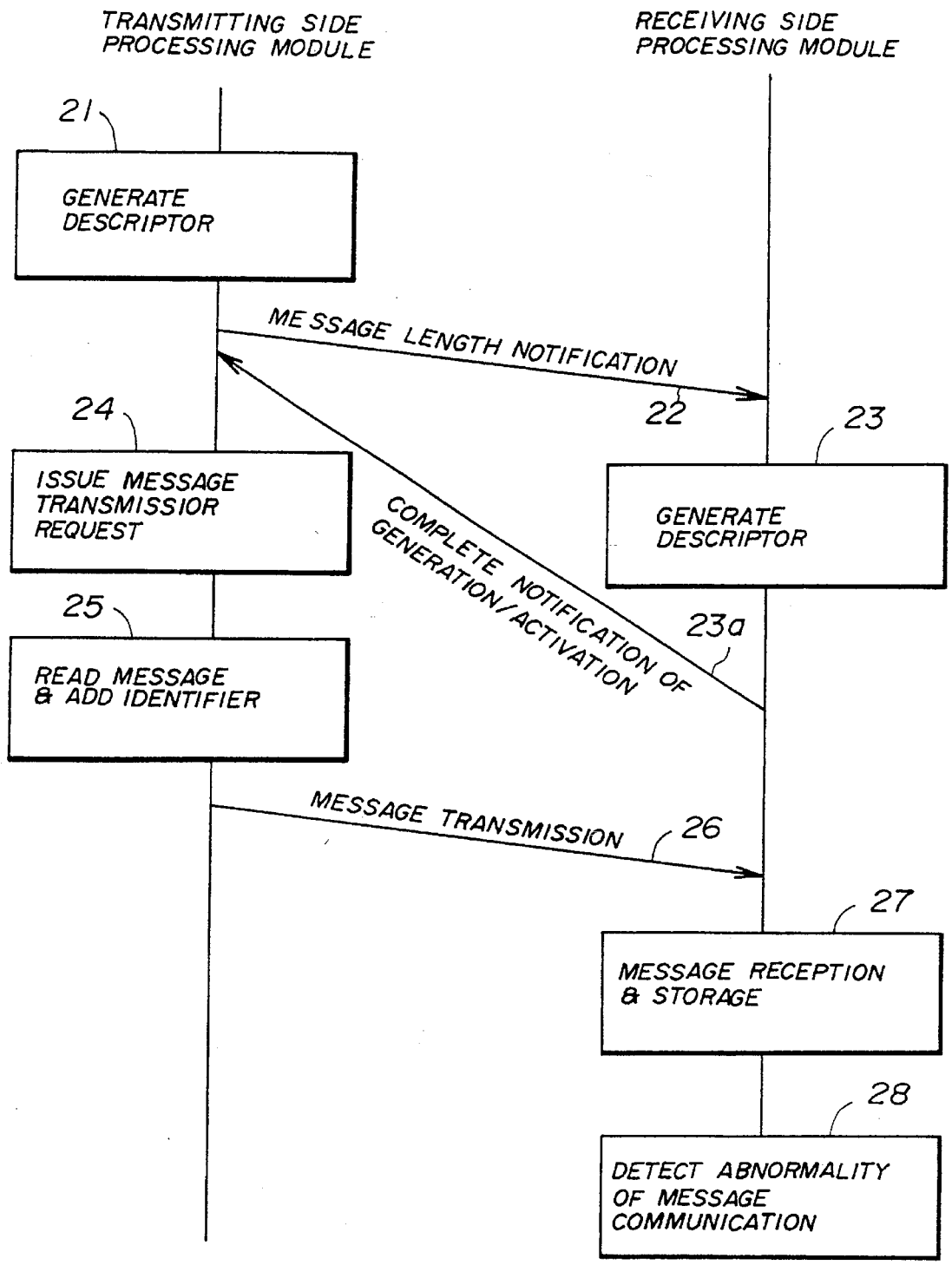
FIG. 2 is a block diagram for explaining the functions of FIG. 1.

Next, a description will be given of the effects of the present invention, as shown in the structural diagram of FIG. 1, by referring to the operation sequence diagram of FIG. 2. First, when there is a need to execute a transmission process for a large message the data processing part 14, of the transmitting side processing module 10, generates the descriptor 15 in the form of the chain by pointing to region information of the storage region which stores the large message which is the subject of the transmission in the transmitting sequence (step 21). Next, the data processing part 14, of the transmitting side processing module 10, sends message length information of the message, which is to be communicated, to the receiving side of the processing module 10 which is the message transmitting destination (step 22).

Responsive to this notification, the data processing part 14 of the receiving side processing module 10 prepares, within the memory unit 12 of its own processing module 10, the arbitrary form buffer 16 which corresponds to the message length, and generates the descriptor 15 in the form of a chain by pointing to the region information of the arbitrary form buffer 16 in the storing sequence (step 23). In addition, the receiving side processing module makes a completion notification of the generation and activation of the descriptor 15 with respect to the transmitting side processing module (step 23a).

Next, the data processing part 14 of the transmitting side processing module 10 requests to add an identifier specifying the use of the prepared arbitrary form buffer 16 and issues a message transmission request (step 24). Responsive to this request, the logical transmitting port 17, of the transmitting side processing module 10, reads out the message from the arbitrary form buffer 16, according to the pointing sequence of the descriptor 15 of its own processing module, and adds the identifier which specifies the use of the arbitrary form buffer 16 (step 25). Thereafter, the logical transmitting port 17 transmits the message to other processing modules 10 (step 26).

When the logical receiving port 18 of the receiving side processing module 10 detects that it is specified as the message destination, the message is added with the identifier which uses the arbitrary form buffer 16. The transmitting source is the processing module 10 which indicated the formation of the arbitrary form buffer 16. The logical receiving port 18 receives the message and stores it in the arbitrary form buffer 16 within its own processing module while referring to the descriptor 15 of its own processing module (step 27).

The abnormality detecting means 19 of the receiving side processing module 10 detects whether or not an abnormality of the message communication exists by detecting whether or not the received message quantity matches the message length indicator, which was received upon generation of the descriptor 15, when completing the reception process of the logical receiving port 18 (step 28), and transmits this result to the data processing part 14 of its own processing module. Hence, the reception process ends.

Therefore, in the system of FIG. 1, a buffer having a form suited for data processing may be used for the buffer 16 which is used for the message exchange, by generating the descriptor 15. For this reason, the transmitting side processing module 10 can transmit the message from the original storage position of the buffer 16 without being restricted by the buffer size within the receiving side processing module 10. In addition, the receiving side processing module 10 can directly receive a large sized message at the most desirable address position.

Figure 3:
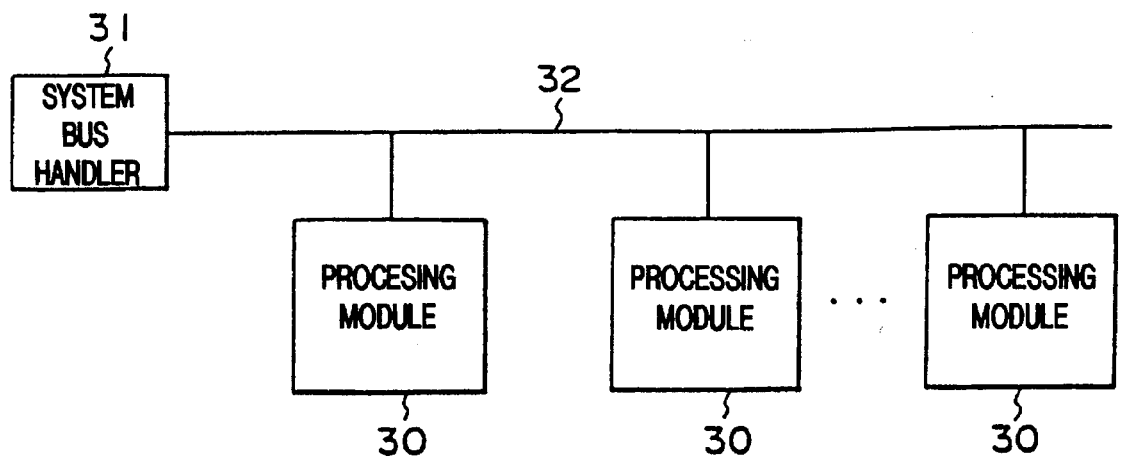
FIG. 3 is a block diagram of the system structure of a multiprocessor system according to the present invention.

FIG. 3 shows a system structural diagram of a multiprocessor system to which the present invention is applied. In the multiprocessor system, a plurality of processing modules 30 (corresponding to the above processing modules 10) are mutually connected via a common system bus 32, the arbitration of which is centrally managed by a system bus handler 31. In this figure, the common system bus 32 is shown as a single bus, but a plurality of common system buses 32 may be provided to connect each of the processing modules 30 via the independent common system buses 32.

Figure 4:
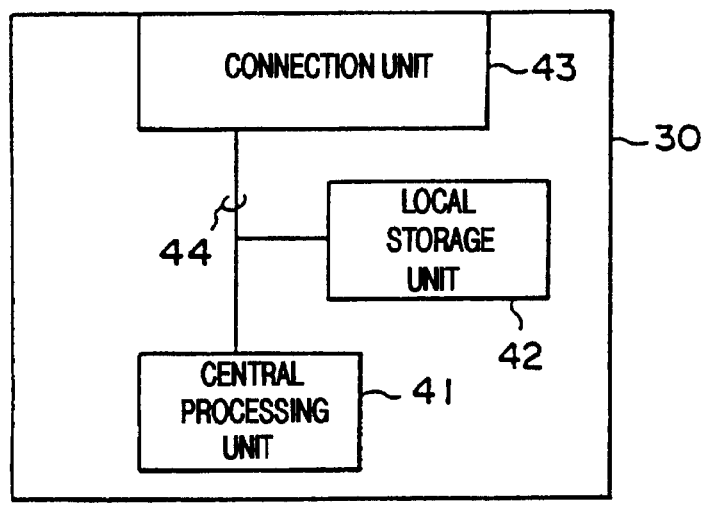
FIG. 4 is a block diagram of a processing module.

FIG. 4 shows a detailed structural diagram of the processing module 30. The processing module 30 includes a central processing unit 41, a local storage unit 42 of a main memory which is locally provided to form the loosely coupled relationship, a connection unit 43 which is provided to process the connection to the common system bus 32, and an internal bus 44 for connecting these units. The central processing unit 41 corresponds to the central processing unit 11 in FIG. 1, the logical storage unit 42 corresponds to the memory unit 12 in FIG. 1, and the connection unit 43 corresponds to the above connection unit 13 in FIG. 1.

In the processing module 30, the software runs on the central processing unit 41 and the local storage unit 42. A series of operations is carried out when the various software mutually cooperate while becoming the communication request source. The central processing unit 41, provided in the processing module 30, fetches the instruction code only from the ROM (not shown) and the local storage unit 42 within its own processing module. In addition, the connection unit 43 is assigned a specific unit number.

Figure 5:
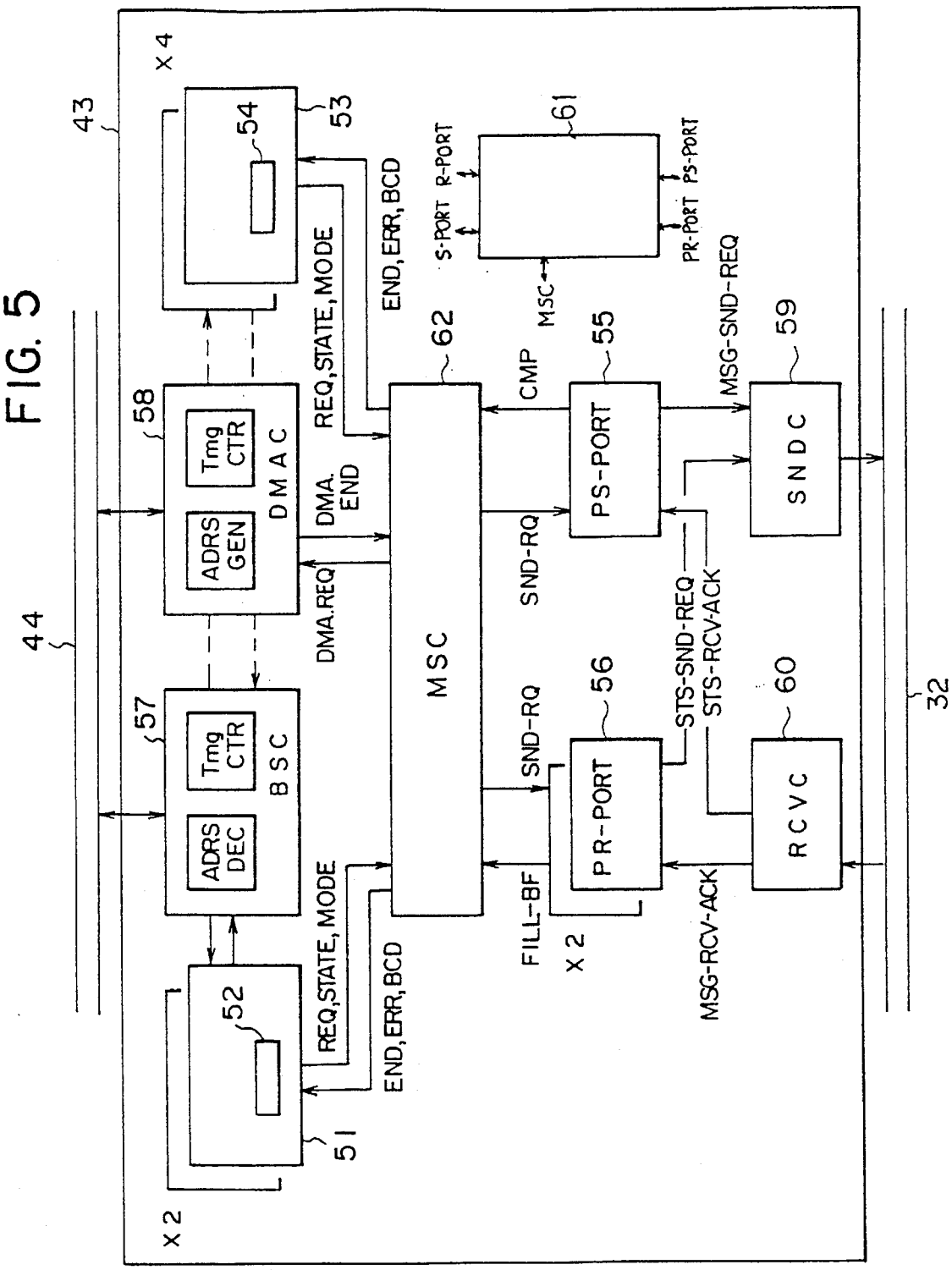
FIG. 5 is a block diagram of an embodiment of a connection unit.

FIG. 5 shows an embodiment of the connection unit 43 which implements the message communication process of the present invention. In FIG. 5, the connection unit 43 includes a logical transmitting port (S-PORT) 51 which can see the software running on the central processing unit 41, a logical receiving port (R-PORT) 53 which can see said software, a physical transmitting port (PS-PORT) 55 which controls the message transmission to other processing modules 30, a physical receiving port (PR-PORT) 56 which controls the message reception from other processing modules 30, an access control unit (BSC) 57 which processes the interface between the internal bus 44, a memory access control unit (DMAC) 58 which makes access to the local storage unit 42 shown in FIG. 4, a transmission control unit (SNDC) 59 which processes the transmission process interface between the common system bus 32, a reception control unit (RCVC) 60 which processes the reception process interface between the common system bus 32, dual port random access memory (RAM) 61 which enables dual access, and a main sequence control unit (MSC) 62 which manages the control of the entire unit. The logical transmitting port 51 has a control register 52, and the logical receiving port 53 has a control register 54. The control registers 52 and 54 may instead be provided in the dual port RAM 61.

The logical transmitting port (S-PORT) 52 corresponds to the logical transmitting port 17, and for example, two such ports are provided as in this embodiment, and two or more such ports are preferably provided. The logical receiving port (R-PORT) 54 corresponds to the above logical receiving port 18. Four such ports are provided in this embodiment, but preferably, four or more such ports are provided. Accordingly, the software, which runs on the central processing unit 41, enables simultaneous transmission of a plurality of messages and enables simultaneous reception of a plurality of messages.

Only one physical transmitting port (PS-PORT) 55 is provided due to its character. In this example, two physical receiving ports (PR-PORT) 56 are provided in this embodiment. Preferably, the number of such ports is smaller than the number of the logical receiving ports 54. In addition, as will be described later, by employing a control system in which the plurality of logical transmitting ports 51 commonly use the physical transmitting port 55 and the plurality of logical receiving ports 54 commonly use the physical receiving port 56, it is possible to reduce the amount of hardware in connection unit 43. In a case where a function is provided on the side of the common system bus 32 from the physical transmitting port 55 to serialize the process of the physical transmitting port 55, it is possible to provide not one but a plurality of physical transmitting ports 55.

A 256-byte holding buffer, corresponding to the physical transfer block on the common system bus 32, is provided in the dual port RAM 61 for each of the logical transmitting ports 51 and the logical receiving ports 53. The number of holding buffers belonging to the logical transmitting port 51 corresponds to the number of physical transmitting ports 55, and the number of holding buffers belonging to the logical receiving port 53 corresponds to the number of physical receiving ports 56.

The physical transmitting port 55 is logically connected to the logical transmitting port 51 according to the control process of the main sequence control unit (MSC) 62, and the transfer request MSG-SND-REQ of the message block within the holding buffer belonging thereto is issued to the transmission control unit (SNDC) 59. The answer STS-RCV-ACK, with respect to the transmission of this message block, is received by the reception control unit 60, and the physical transmitting port 55 executes the process of notifying the logical transmitting port 51.

Figure 6A:
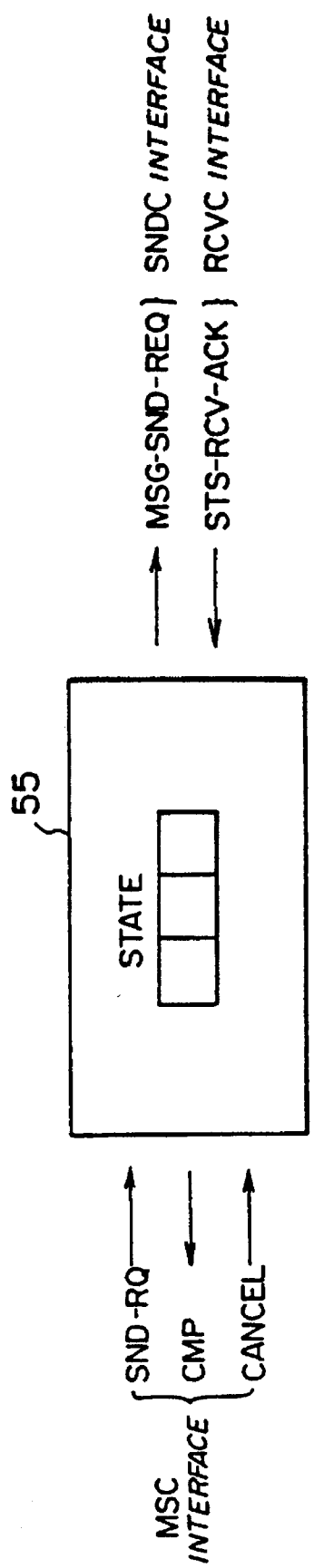
FIGS. 6(a) and 6(b) are diagrams of an operation state transisition of input and output signals in an embodiment of a physical transmitting port according to the present invention.
Figure 6B:
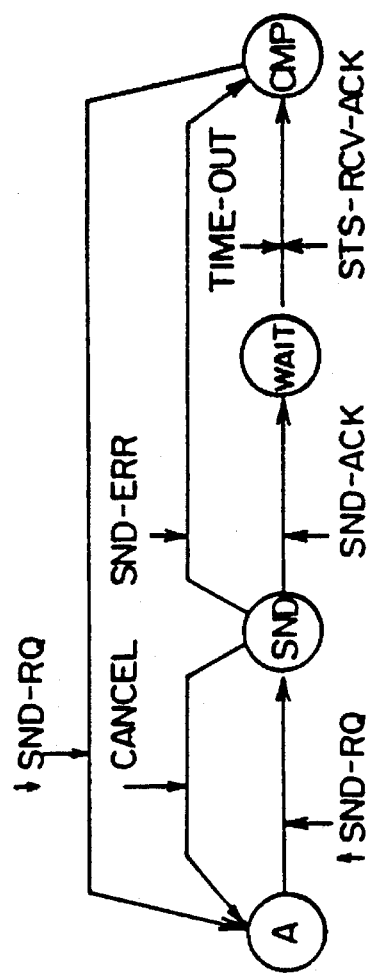

The input and output signals of this physical transmitting port (PS(PORT) 55 are shown in FIG. 6(a), and an embodiment of the state transition of this process is shown in FIG. 6(b). As shown in FIG.6(a), the cancel request (CANCEL) and the message transmission request SND-RQ from the main sequence control unit (MSC) 62 are input to the physical transmitting port (PS-PORT) 55, and the physical transmitting port 55 makes a process resume request CMP with respect to the MSC 62.

As shown in FIG. 6(b), the PS-PORT 55 undergoes a transition to the SND stage if said message transmission request SND-RQ is input in an A state in which the message transmission request SND-RQ from the MSC 62 is waited.

In the SND state, the message block is transmitted to the system bus 32 via the SNDC 59.

In the SND state, a transition takes place to the WAIT state by the normal signal SND-ACK from the SNDC 59 or to the CMP state by the abnormal signal SND-ERR. In addition, a transition takes place to the A state after withdrawing the request to the SNDC 59 when there is the CANCEL request from the MSC 62.

The WAIT state is the state in which the status reception from the receiving side processing module is waited. When the status reception complete signals STS-RCV-ACK is input from the reception control unit (RCVC) 60 in the WAIT state or, when the status reception time is out, a state transition takes place to the CMP state. In this CMP state, the transmission complete signal is transmitted to the MSC 62, and the resumption of the process is requested. A state transition takes place to the A state when the recognition signal (=transmission request) to the MSC 62 from the PS-PORT 55 in the CMP state is withdrawn.

On the other hand, when the physical receiving port (PR-PORT) 56 receives the reception start notification by the storage of the transmitting message block into the holding buffer belonging thereto according to the process of the reception control unit (RCVC) 60, the physical receiving port 56 is logically connected to the logical receiving port 53 which is to receive according to the control process of the main sequence control unit (MSC) 62. After completion of the operation of the logical receiving port 53, the physical receiving port 56 executes the process of issuing the answer transmission request STS-SND-REQ of the reception completion to the transmission control unit (SNDC) 59.

Figure 7A:
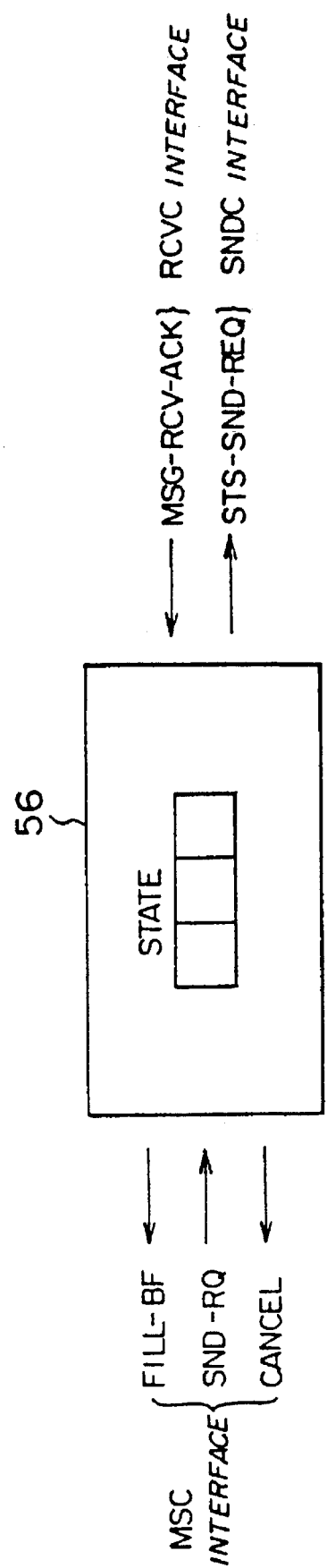
FIGS. 7(a) and 7(b) are diagrams of an operation state transisition of input and output signals in an embodiment of a physical receiving port according to the present invention.
Figure 7B:
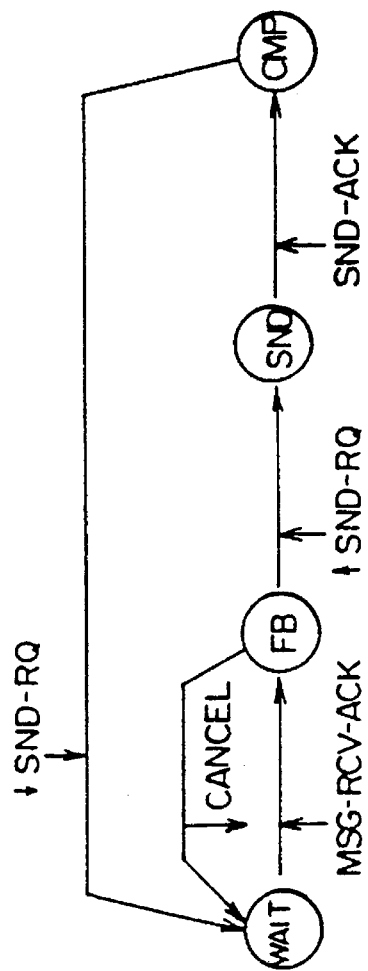

The input and output signals of the physical receiving port (PR-PORT) 56 are shown in FIG. 7(a), and an embodiment of the state transition of the process is shown in FIG. 7(b). As shown in FIG. 7(a), the message reception start signal MSG-RCV-ACK from the reception control unit (RCVC) 60 is input to the physical receiving port (PR-PORT) 56 other than the above answer transmission request STS-SND-REQ. In addition, the status transmission request SND-RQ from the main sequence control unit (MSC) 62 is input to the physical receiving port 56, and the physical receiving port 56 outputs the cancel request CANCEL and the FB state signal FILL-BF with respect to the MSC 62.

As shown in FIG. 7(b), when the message reception start signal MSG-RCV-ACK from the RCVC 60 is input to the PR-PORT 56 during the WAIT state, in which the message reception is waited, a state transition takes place to the FB state. This FB state transmits the reception start to the MSC 62 by the above, FILL-BF and is a state which requests the start of the process. After transmitting the reception complete signal to the RCVC 60, the PR-PORT 56 makes a transition to the SND state by the status transmission request SND-RQ of the MSC 62. Further, when there is the CANCEL request from the RCVC 60, a state transition takes place to the WAIT state after withdrawing the request to the MSC 62.

The SND state is a state in which the status block is transmitted to the system bus 32 via the SNDC 59. In this SND state, the PR-PORT 56 makes a state transition to the CMP state upon the transmission of the complete signal SND-ACK from the SNDC 59. This CMP state transmits the transmission completion to the MSC 62, and is a state in which the resumption of the process is requested. When the recognition signal (=transmission request) from the MSC 62 is withdrawn in the CMP state, the PR-PORT 56 makes a state transition to the WAIT state.

Returning again to the description of FIG. 5, the access control unit (BSC) 57 carries out control when the connection unit 43 becomes the bus slave of the internal bus 44, and is provided with functions such as decoding the address information of the specified register and carrying out a control to match the timing with the internal bus 44. The access control unit 57 transmits the data information from the side of the internal bus 44 to the logical transmitting port 51 or the logical receiving port 53, and transmits the data information from the side of the logical transmitting port 51 or the logical receiving port 53 to the internal bus 44.

When the connection unit 43 becomes the bus master of the internal bus 44, the memory access control unit (DMAC) 58 makes direct access to the local storage unit 42, according to the indication from the main sequence control unit (MSC) 62, and executes the data transfer between the local storage unit 42 and the dual port RAM 61.

FIG. 8 shows an embodiment of the input and output signals of the DMAC 58 which includes a block number counter 70 and the like. The DMAC 58 is provided with functions such as generating the address information for making the access and carrying out a control to match the timing with the internal bus 44.

The transmission control unit 59 makes the transmission start request to the common system bus 32 and the control of each transmission (transmission of message/block transmission of answer) according to the requests of the physical transmitting port 55 and the physical receiving port 56. The reception control unit 60 monitors the common system bus 32, and stores the data in the corresponding address of the dual port RAM 61 if the message block or answer is intended for its own unit number. Then, the reception control unit 60 carries out the process of notifying the logical transmitting port 51 or the logical receiving port 53 via the physical transmitting port 55 or the physical receiving port 56.

The work regions for the logical transmitting port 51 and the logical receiving port 53 are provided in the dual port RAM 61, in addition to the above-described holding buffer. The access to this dual port RAM 61 is made by the main sequence control unit (MSC) 62 from the bus control part which is on the side of the PM internal bus 44 and is formed by the logical transmitting port 51, the logical receiving port 53, the access control unit 57 and the memory access control unit 58. Access to this dual port RAM 61 is also made from the bus control part which is on the side of the common system bus 32 and is formed by the physical transmitting port 55, the physical receiving port 56, the transmission control unit 59 and the reception control unit 60. The main sequence control unit (MSC) 62, the dual port RAM 61 and the like realize each of the above means 23 to 35.

Figure 9:
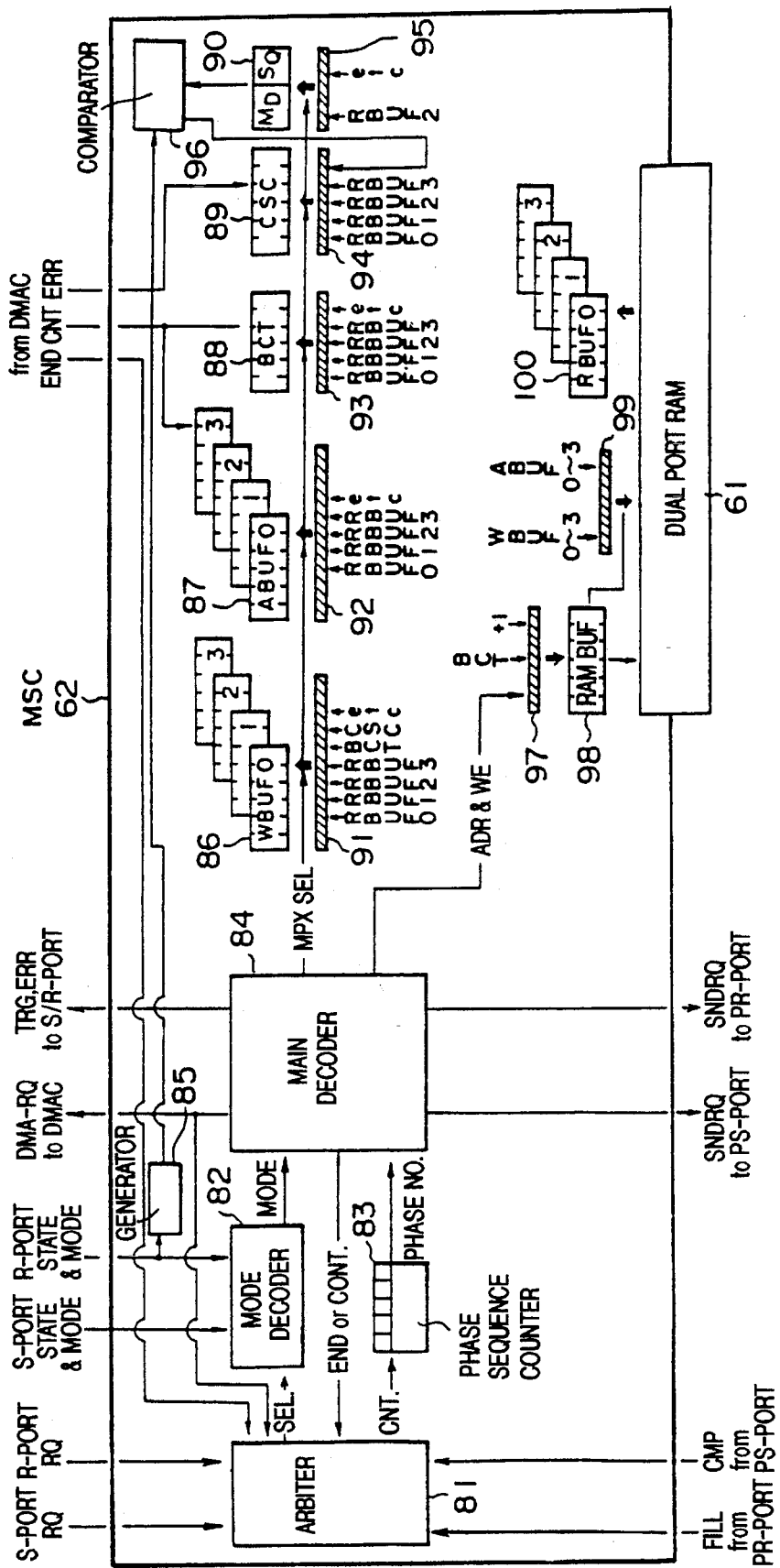
FIG. 9 is a block diagram of an embodiment of a main sequence control unit.

FIG. 9 shows a structural diagram of an embodiment of the above main sequence control unit (MSC) 62. As shown in this figure, the MSC 62 includes an arbiter 81, a mode decoder 82, a phase sequence counter 83, a main decoder 84, a generator 85, a work buffer (WBUF) 86, an address buffer (ABUF) 87, a byte counter buffer (BCT) 88, an end code buffer (CSC) 89, a buffer 90, selectors 91 to 95, 97 and 99, a comparator 96, a RAM address buffer 98, a RAM buffer 100 and the like.

The selectors 91 to 95 and 97 are respectively provided in correspondence with the input sides of the buffers 86 to 90 and 98, and switch and output the data from the RAM buffer 100 based on a select signal from the main decoder 84. The selector 91 also selectively outputs the data from the BCT 88 and the CSC 89. In addition, the selector 94 selects and outputs the output signal of the comparator 96 to the CSC 89. Furthermore, the selector 99 selects and supplies the output data of the WBUF 86 and the ABUF 87 to the dual port RAM 61. The dual port RAM 61 is used as the work area of the MSC 62.

In the MSC 62, the arbiter 81 receives the process request RQ from the S-PORT 51 or the R-PORT 53 or the state notification from the PS-PORT 55 or the PR-PORT 56, and selects the same according to an appropriate priority sequence. The phase sequence counter 83 starts to operate from the time when this selection is made. In addition, the operation mode is determined depending on the selected port and the state of this port.

Next, the MSC 62 successively selects and processes the information from the dual port RAM 61 according to the phase which is determined by the determined operation mode and the output value of the phase sequence counter 83. The information is extracted to each buffer group of the WBUF 86, the ABUF 87, the BCT 88 and the CSC 89, and is written into the dual port RAM 61 again. Moreover, the DMAC 58, shown in FIG. 5, is activated if necessary during this procedure.

The MSC 62 activates the S-PORT 51, the R-PORT 53, the PS-PORT 55 or the PR-PORT 56 during or at the end of the above phase depending on the operation mode. At the end of the above phase, the MSC 62 transmits an end signal from the main decoder 84 to the arbiter 81 to release the arbiter 81. In addition, the MSC 62 supplies a trigger signal or an error signal to the S-PORT 51 and the R-PORT 53 so as to make a state transition of each port. Depending on the situation, the main decoder 84 outputs a control signal to the arbiter 81 and continues the next process with the same port.

Next, a description will be given of an activation interface between hardware and software.

Figure 10:
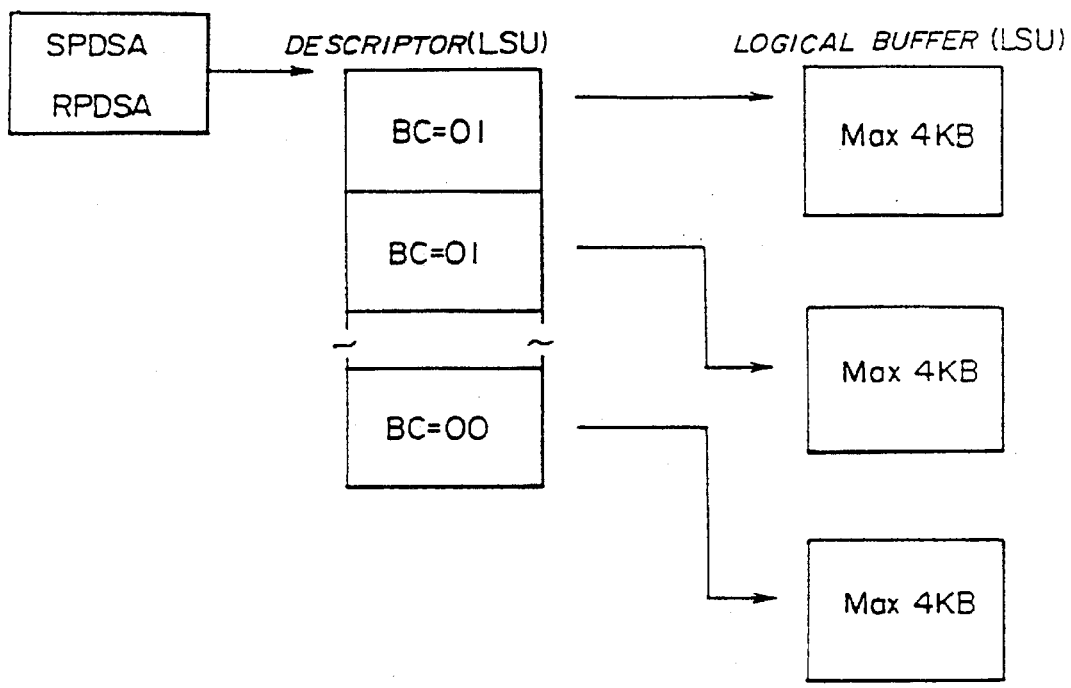
FIG. 10 is a diagram showing an embodiment of a descriptor.

The software which runs on the central processing unit 41, shown in FIG. 4, arranges the descriptor which indicates the detailed control contents in the logical storage unit 42 when activating the S-PORT 51 or the R-PORT 53. FIG. 10 shows an embodiment of the structure of this descriptor.

The descriptor (15 in FIG. 1) arranged in the local storage unit (LSU) 42 takes the same structure for the S-PORT 51 and the R-PORT 53, and is arranged in a sequential format, as shown in FIG. 10, taking 16 bytes as one entry or in a branch format.

The head entry of this descriptor is pointed by the address information which is set in the regions "SPDSA" and "RPDSA" within the control registers (52 and 54 shown in FIG. 5) in the S-PORT 51/R-PORT 53. Each entry is written with the address information, size information and the like of the logical buffer (corresponding to the arbitrary form buffer 16 in FIG. 1 and for example, each having a capacity of 4 kbytes) in the local storage unit (LSU) 42.

Figure 11:
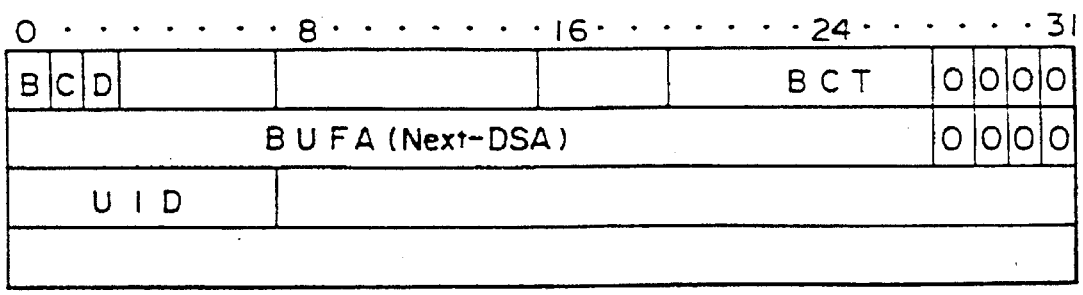
FIG. 11 is a diagram showing an embodiment of managing data of an entry of the descriptor.

FIG. 11 shows an embodiment of the entry managing data of this descriptor. The combination of the B bit and C bit in this figure indicates continuation to the next entry which is sequentially arranged after the processing of the instant entry ends if "BC=01", "BC=11" it indicates the branching to the entry which is indicated by the instant entry, if "BC=00", it indicates the end of the process after the processing of the instant entry ends, and if "BC=10", it indicates the end of the process without executing the process of the instant entry. In addition, the D bit in FIG. 11 indicates the existence or non-existence of an interrupt to the software at the time when the processing of the instant entry is completed.

In FIG. 11, the 1-byte information field indicated by "BCT", the information field indicated by "BUFA" and the information field indicated by "UID" have contents which differ for the S-PORT 51 and the R-PORT 53.

In the entry managing data of the descriptor for the S-PORT 51, the byte size (units of 16 bytes, maximum of 4 kbytes) of the logical buffer in the local storage unit 42 treated by the instant entry is stored in the PCT information field, the head address (16-byte boundary address) of said logical buffer is stored in the BUFA information field, and the unit number of the connection unit (MBC) 43 of the transmitting processing module is stored in the UID information field.

On the other hand, in the entry managing data of the descriptor for the R-PORT 53, the size information of the logical buffer depending on the communication mode is stored in the BCT information field, the head address of the logical buffer in the local storage unit 42 treated by the instant entry is stored in the BUFA information field, and the unit number of the connection unit 43 of the transmitting processing module received is stored in the UID information field.

In the above communication mode, there is the ANY mode and the SPECIFIC mode. The ANY mode is the mode in which an arbitrary message transmitted therefor is received, and there is a level 0 which is used for the normal communication process and a level 1 which is used for the emergency communication process. The SPECIFIC mode is the mode in which an agreement is made in advance between the transmitting side and the receiving side, and the large amount of messages which are the subject of the transmission is directly communicated to the specified address region and not the general buffer. In the above entry managing data for the R-PORT 53, the size information of the received message is stored in the BCT information field in the ANY mode while the predetermined size information is stored in the BCT information field in the SPECIFIC mode.

If the BC bits specify the branching of the entry, the branching address information of the entry is stored in the BUFA information field, but nothing is specified in the BCT information field and the UID information field.

The software which runs on the central processing unit 41 writes the control indication in the control register 52 of the S-PORT 51 if the descriptor is arranged in the local storage unit 42 and thereafter the S-PORT 51 is activated. In addition, when activating the R-PORT 53, the software writes the control indication in the control register 54 of the R-PORT 53.

FIG. 12 shows an embodiment of the control indication data set in the control register 52 of the S-PORT 51, and FIG. 13 shows an embodiment of the control indication data set in the control register 54 of the R-PORT 53. In FIG. 12, "SPDSA", "SPODF" and "SPFCP" are the regions in which the software running on the central processing unit 41 writes. The software writes the address information DSA of the first descriptor which starts the control in this "SPDSA", the indication of communication mode in which the communication process is to be carried out among the level 0 of the ANY mode, the level 1 of the ANY mode and the SPECIFIC mode in "SPODF", and the indication of the forced end during operation in "SPFCP".

In addition, in FIG. 12, "SPOPS" and "SPCST" are the regions in which the software writes on the side of the connection unit 43 and then reads. The connection unit 43 writes the entry address information CDSA of the descriptor which is being processed in the "SPOPS", and writes the end state information CSC in the "SPCST". When the write access to the "SPODF" is executed, the S-PORT 51 is activated.

On the other hand, in FIG. 13, "RPDSA", "RPODF", "RPFCP" and "RPSSI" are the regions in which the software, running on the central processing unit 41, writes. The software writes the address information of the first descriptor which starts the control in the region "RPDSA", writes the indication of the operation mode in "RPODF", writes the indication of the forced end during operation in "RPFCP", and writes the unit number of the transmitting connection unit 43 which is specified in the case of the SPECIFIC mode before the start.

In addition, in FIG. 13, "RPOSP" and "RPCST" are the regions in which the software writes on the side of the connection unit 43 and then reads. The connection unit 43 writes the entry address information CDSA of the descriptor within the processing signal in "RPOPS", and writes the end state information CSC in "RPSCT". When the write access to the described "RPODF" is executed, the R-PORT 53 is activated. The unit number written in "RPSSI" is used to decide whether or not the message is from the connection unit 43 specified as the transmitting source when making the reception process in the SPECIFIC mode.

The software which runs on the central processing unit 41 must specify and start the communication mode to the level 0 of the ANY mode for at least one of the two R-PORTs 53 which are provided in order to execute the normal communication process. This software must specify and start the communication mode to the level 1 of the ANY mode for at least one of the two R-PORTs 53 in order to execute the emergency communication process. By making this preparation, it is possible to communicate the emergency message without confusing it with a normal message.

The software of each processing module activates the S-PORT 51 at any time when the transmission process in the ANY mode becomes necessary. In this case, the unit number of the connection unit 43 of the transmitting destination set in the UID information field of the entry of the descriptor for the S-PORT 51 can be set independently for each entry. If a plurality of S-PORTs 51 are provided, the unit number can also be set independently for each S-PORT 51. Hence, the software can carry out the transmission process with respect to a plurality of processing modules 30 at the same time.

In addition, when carrying out the communication process in the SPECIFIC mode (hereinafter referred to as the SPC mode), the software of the transmitting side processing module 30 must notify the receiving side processing module 30 in advance using the ANY mode to advise that the communication will be carried out in the SPC mode and the byte length of this communication. The software of the receiving side processing module 30 makes the preparations for the reception when the above notification is received, including the arranging of the descriptor and the activation of the R-PORT 53, and thereafter returns an answer message to the transmitting side processing module 30. When the software of the transmitting side processing module 30 confirms this answer message, the S-PORT 51 is activated in the SPC mode and the communication process in the SPC mode is executed.

Next, a description will be given of examples of use of the descriptor of the data processing part of each processing module 30, by referring to FIG. 14 and FIGS. 15A to 15C. Normally, 3 of the 4 R-PORTs 53 are set as the normal communication port in the level 0 of the ANY mode (ANY0 mode) and 1 is set as the emergency port of the ANY1 mode. In the message communication of this embodiment, it is desirable that the R-PORT 53 is constantly in the receivable state because the transmitting side initiating data transfer is carried out (that is, it is uncertain when and who will transmit data). Hence, a plurality of descriptors of the R-PORTs 53 are chained, and the chain is looped by the branch function so that the descriptor will not be exhausted.

Figure 14:
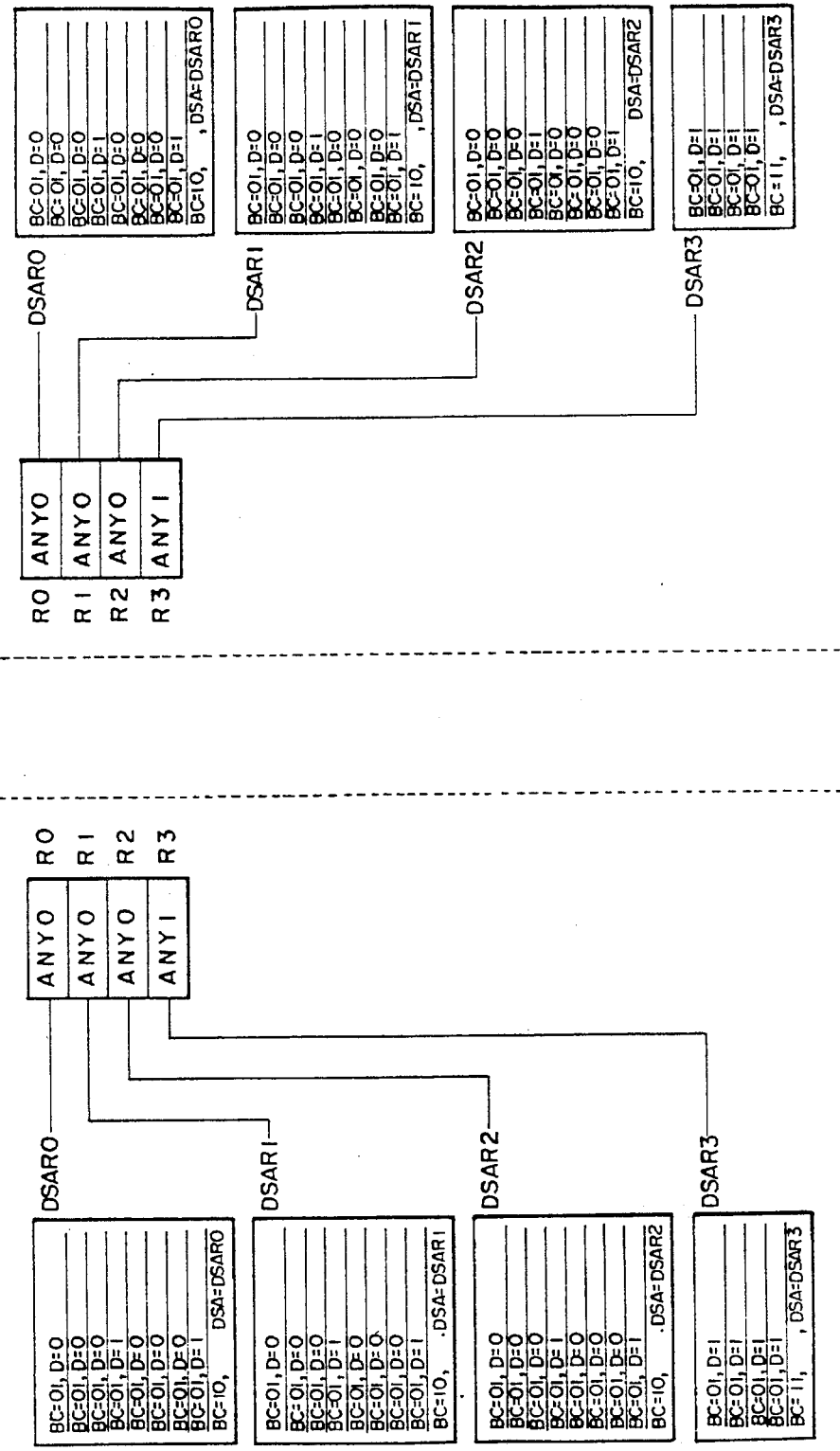
FIG. 14 is a diagram showing an example of use of a descriptor of the data processing part of the processing unit.

The construction of the descriptor of the R-PORT 53 will hereafter be described in detail in conjunction with FIG. 14. First, each of the descriptors which are set to the ANY0 mode and in which the first address information DSA is R0, R1 and R2, are constructed from 8 entries (data region of 8×4 KB=32 KB) and 1 branch entry. The 8 entries are respectively chained by BC=01, and starts to receive the data of the ANY0 mode because the D bit is set for every 4 entries, and an interrupt is generated with respect to the data processing part when up to the entry of the D bit is received. The data processing part in response to this interrupt processes the entries from the head to the entry which generated the interrupt. Thereafter, the data processing part rewrites the BC bits within the entry which generated the interrupt to 10, and rewrites the BC within the branch entry to 11.

The reception in the ANY0 mode is carried out even while the data processing part processes the entries, and the interrupt by the D bit is generated when the processing is made to the eighth entry. After the eighth entry ends, it is indicated that the processing of the data processing part is not yet ended if the BC bits within the branch entry remains to be 10, and the R-PORT 53 ends at this point. If the processing of the data processing part is made in time as described above, the BC bits are already rewritten to 11, and thus, the branch process is continued to the head descriptor. The data processing part processes the fifth to the eighth entries when the interrupt from the eighth entry is recognized, rewrites the BC bits of the preceding fourth entry to 01, and sets BC=10 in the branch entry.

Accordingly, when the process of the R-PORT 53 loops to the head by the branch entry and the fourth entry is reached before the processing of the data processing ends, the R-PORT 53 ends there, and the processing is continued for the processing of the data processing part. The 8 entries are looped in this manner and used, so as to prevent the reception buffer from becoming exhausted. The number of entries is determined depending on the processing capability of the data processing part. For example, if the capability of the data processing part is insufficient compared to the amount of the received message, the number of entries which are chained is increased so as to lengthen the intervals of the interrupts.

Next, in FIG. 14, the descriptor which is set in the ANY1 mode and in which the first address information DSA is R3, is formed by 4 entries (data region of 4×4 KB=16 KB) and one branch entry. The 4 entries are respectively chained to BC=01, and since the D bit is set for all of these entries, an interrupt is generated with respect to the data processing part immediately when the data of the ANY1 mode is received. The data processing part processes the entries in response to the interrupt. ANY1 indicates the emergency message, and thus, is processed with priority over others. Hence, BC=11 is set in the branch entry and the branch is constantly possible. A number of entries sufficient to enable reception even when the messages of the ANY1 level are simultaneously transmitted from a plurality of processing modules.

In the present invention, the construction of the data buffer, that is, whether or not the region of 8×4 KB is continuous and whether the address is fixed or variable, is not mentioned. This matter is completely program dependent.

No specific illustration or description will be given of the descriptor of the transmitting port, because the entry is constructed depending on the transmitting data every time the transmitting data is generated. Generally, the transmitting process is successively made at the same time as the activation, and there is no process such as setting the D bit in between or looping by the branch as in the case of the receiving port.

Figure 15A:
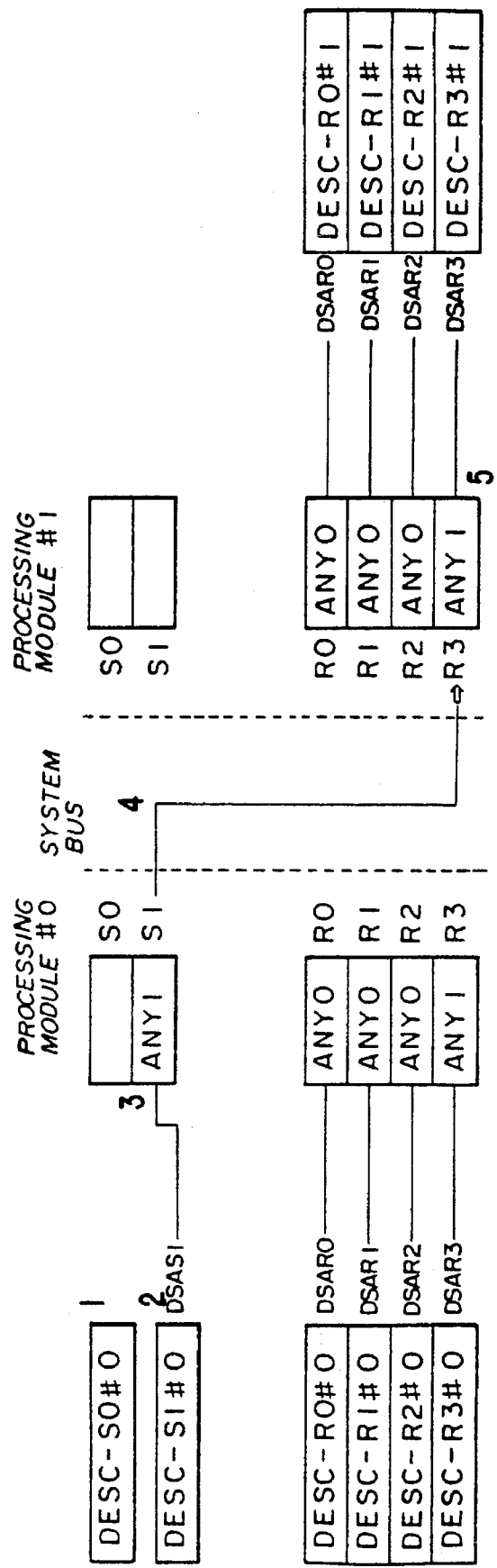
FIG. 15A is a diagram for explaining a message communication in a SPECIFIC mode.
Figure 15B:
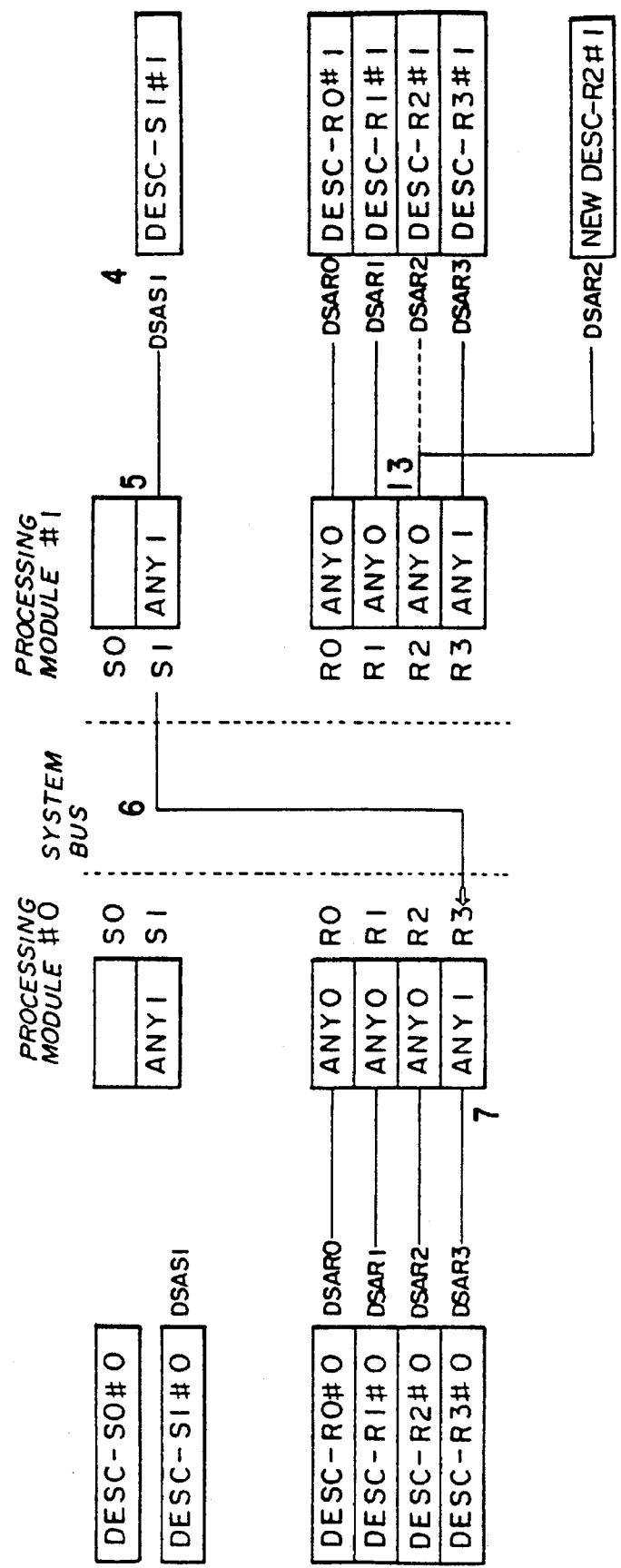
FIG. 15B is a diagram for explaining a message communication in a SPECIFIC mode.
Figure 15C:
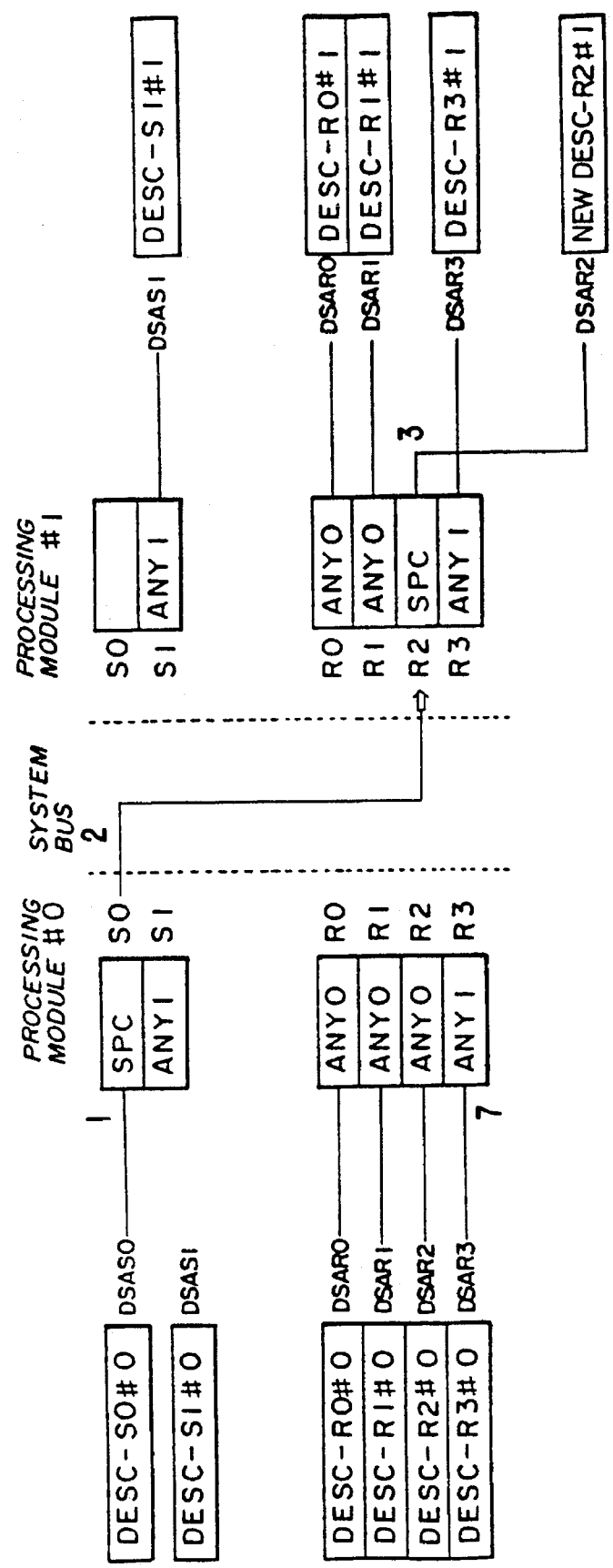
FIG. 15C is a diagram for explaining a message communication in a SPECIFIC mode.

Next, a description will be given of an example of the message communication in the SPECIFIC (SPC) mode, by referring to FIGS. 15A to 15C. FIG. 15A shows up to the point of notifying the processing module #1 that a message in the SPC mode is to be transmitted from the processing module #0, FIG. 15B shows up to the point of notifying the processing module #0 that the preparation for the SPC reception is completed from the processing module #1, and FIG. 15C shows the message transfer in the SPC mode. In these figures, the descriptor entries (group) are shown in one box regardless of their number.

In FIG. 15A, when the processing module #0 transmits that the message in the SPC mode is to be transmitted:

1) The descriptor entries (group) DESC-S0#0 are generated based on the data to be transferred in the SPC mode;

2) The information (the data length in the SPC mode and the like) to be transmitted to the processing module #1 and its descriptor DESC-S1#0 are generated;

3) The message in the ANY1 mode is activated;

4) The data transfer is made on the system bus; and

5) The receiving port R3 of the processing module #1 and in the ANY1 mode generates an interrupt, and thus, the processing module #1 obtains the information necessary for the reception in the SPC mode.

Accordingly, the processing module #1 notifies the completion of the preparation to #0 as shown in FIG. 15B. First:

1) The receiving port R2 is forcibly ended (N bit of the RPFCP is set);

2) The descriptor entries (group) "DESC-R2#1 for the SPC are generated from the above information;

3) The receiving port R2 is activated in the SPC mode;

4) The data notifying the activation completion and the descriptor DESC-S1#1 are generated;

5) The data of 4) is transferred in the ANY1 mode;

6) The transfer on the system bus is made; and

7) The receiving port R3 of the processing module #0 and in the ANY1 mode generates an interrupt, and thus, the processing module #0 recognizes the completion of the preparation at #1. Hence, the SPC mode transfer is thereafter carried out from the processing module #0 to #1 as shown in FIG. 15C. In other words:

1) The transmission is activated in the SPC mode (preparations of the descriptor and data are already made);

2) The data transfer is made on the system bus; and

3) The receiving port R2 of the processing module #1 receives the message in the SPC mode.

Therefore, the processing of the SPC message from the processing module #0 to #1 is carried out as described above. Thereafter, the receiving port in the SPC mode is returned again to the ANY0 mode so that the normal process is carried out.

Next, a detailed description will be given of the data transfer system between the processing modules 30.

In this example, it is assumed that the byte size of the logical buffer which can be specified by one entry of the descriptor is 4 kbytes (units of 16 bytes) at the maximum, and thus, the maximum length of the message which can be specified by one entry of the descriptor is 4 kbytes. Further, the unit of the message which can be transferred at one time on the common system bus 32 is 256 bytes, and thus is relatively small in this example.

The connection unit 43 of this embodiment carries out the transfer by dividing the message into parts of 256 bytes which is the transfer unit of the common system bus 32, and the odds are transferred in the last block. The transmitting side connection unit 43 adds identifiers F(First)/M(Middle)/L(Last/S(Single) to each transfer unit on the common system bus 32 in order to identify the first block, the middle block and the last block of the series of messages. On the other hand, the receiving side connection unit 43 carries out the process of reassembling the message which is transmitted according to this identifier.

Other than the identifier, the transmitting side connection unit 43 adds the communication mode, the unit number of itself which is the transmitting source, the unit number of the connection unit 43 at the transmitting destination, the byte length to be transmitted and the port number (may be omitted) of the S-PORT 51 at the transmitting source to the command and transmits the transmitting message.

Figure 16A:
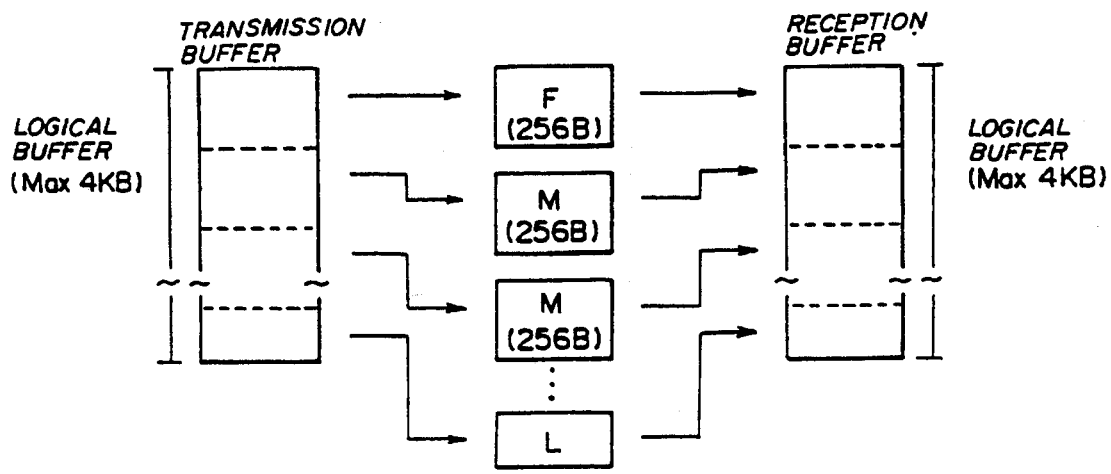
FIGS. 16(a)–16(c) are diagrams of a message block transfer in the ANY mode.

In the ANY mode, the message in the logical buffer specified by each entry of the descriptor is treated as the message forming one transfer unit, and is transferred to the processing module 30 at the communication destination. In the ANY mode, if the length of the message to be transferred exceeds 256×2 bytes, the connection unit 43 transfers the message amounting to the first 256 bytes by adding the identifier F as shown in FIG. 16(a), thereafter successively transfers in 256 bytes by adding the identifier M, and finally transfers the odds amounting to the remaining bytes by adding the identifier L.

Figure 16B:
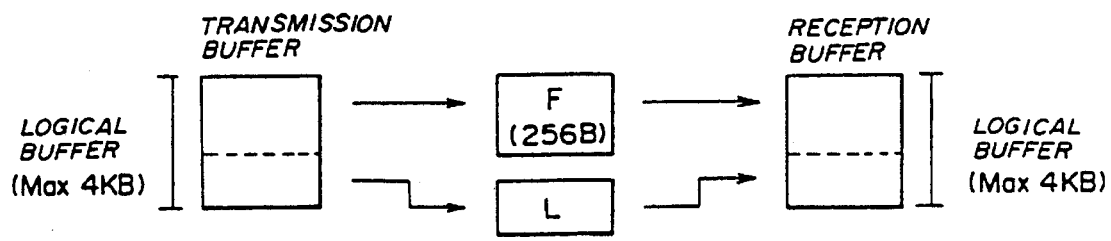
Figure 16C:
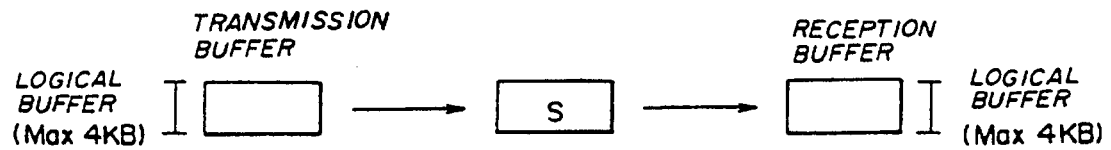

If the length of the message to be transferred falls between 256 bytes and 256×2 bytes, the connection unit 43 transfers the message amounting to the first 256 bytes by adding the identifier F as shown in FIG. 16(b), and then transfers the odds amounting to the remaining bytes by adding the identifier L. In addition, if the length of the message to be transferred is less than or equal to 256 bytes, the message amounting to this number of bytes is transferred by adding the identifier S as shown in FIG. 16(c).

Hence, in the ANY mode, the transfer process ends with the transfer of the series of F to L blocks or the transfer of the single S block at both the transmitting and receiving sides. Moreover, the F and M blocks are constantly transferred in 256 bytes, and the S and L blocks are transferred in 256 bytes or less.

On the other hand, in the SPC mode, the entire message in the logical buffer, which is specified by the entry connected to the descriptor chain, is treated as the message forming one transfer unit, and is transferred to the logical buffer which is connected by the chain of the processing module 30 at the transmitting destination.

The SCP mode employs such a transfer system to enable transmission in the fine division, so that it is possible to reduce the overhead required for the re-transfer of data within the local storage unit 42 at the transmitting and receiving sides because the logical buffer is a general buffer as in the case of the ANY mode. Furthermore, a message having a large quantity can be transmitted without being affected by the size of the logical buffer which is generally provided.

Figure 17:
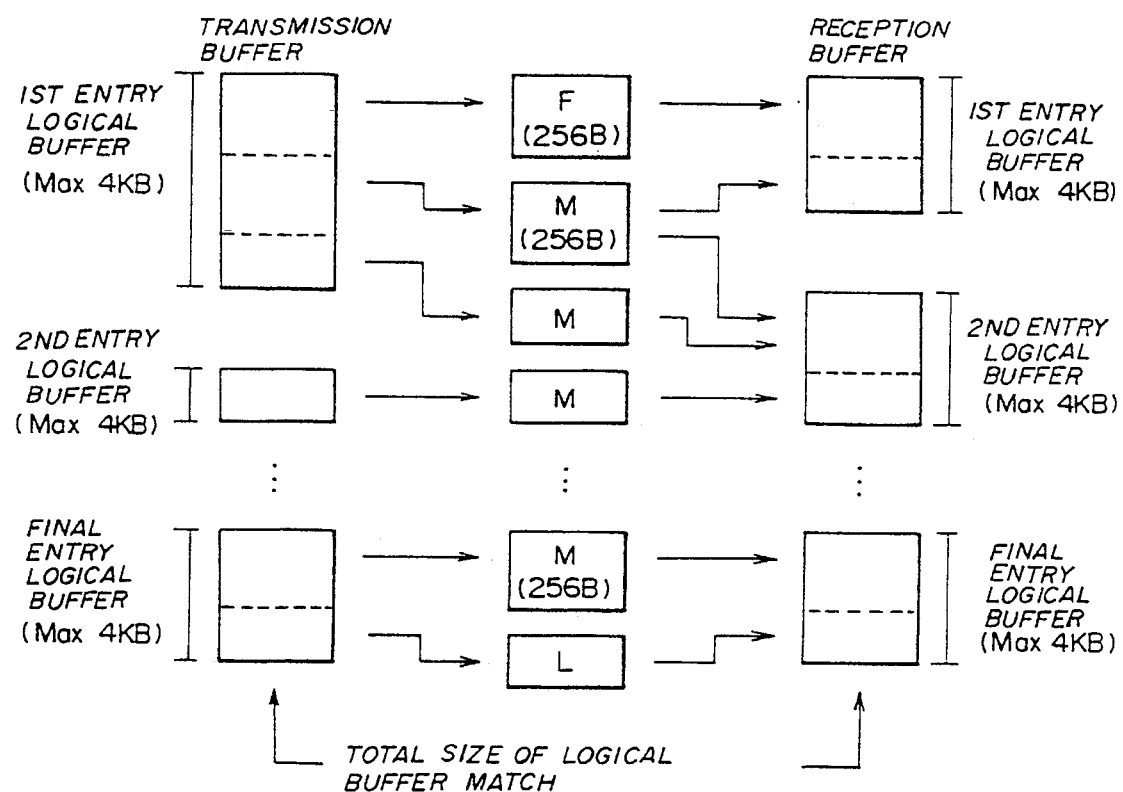
FIG. 17 is a diagram of a message block transfer in the SPECIFIC mode.

In the case of the SPC mode, the first block of the first entry is the F block, the last block of the last entry is the L block, and the other middle entries are the M blocks as shown in FIG. 17. The connection unit 43 of the transmitting side transfers as one transfer blocks the unit of 256 bytes or the entry to the buffer boundary. In addition, the connection unit 43 of the receiving side carries out the store process of the next entry into the logical buffer if the buffer boundary of the entry is detected during the transferring block.

In the SPC mode, the F and M blocks are not necessarily limited to 256 bytes, and the renewal of the entry at the transmitting and receiving sides are not always synchronized. However, the total size of the logical buffer for all entries on the transmitting side of course matches the total size of the logical buffer for all entries on the receiving size. In the present invention, a means is provided to confirm this match so as to detect the redundant or missing message in the SCP mode.

In the present invention, the logical connection between the transmitting side S-PORT 51 and the receiving side R-PORT 53 during communication of the series of messages starts by the transmission and reception of the F block and ends with the transmission and reception of the L block. The connection information related to this logical connection is held in the transmitting side S-PORT 51 and the receiving side R-PORT 53.

Generally, the plurality of S-PORTs 51 of each connection unit 43 simultaneously have the logical connection relationship to the R-PORTs 53 of other connection units 43.

The MSC 62 of each connection unit 43 switches the physical transmitting port (PS-PORT) 55 of its connection unit 43. This switching process is executed in units of one entry of the descriptor. The processes of the plurality of PS-PORTs 55 of each connection unit 43 are alternately executed in entry units and serialized by the switching process of this MSC 62.

In the ANY mode, the logical connection relationship between the transmitting side S-PORT 51 and the receiving side R-PORT 53 ends for every entry unit. On the other hand, in the SPC mode, since one message is formed by a plurality of entries, the switching of the PS-PORT 55 is carried out in a state where the logical connection between the transmitting side S-PORT 51 and the receiving side R-PORT 53 is maintained during the message unit.

Figure 18:
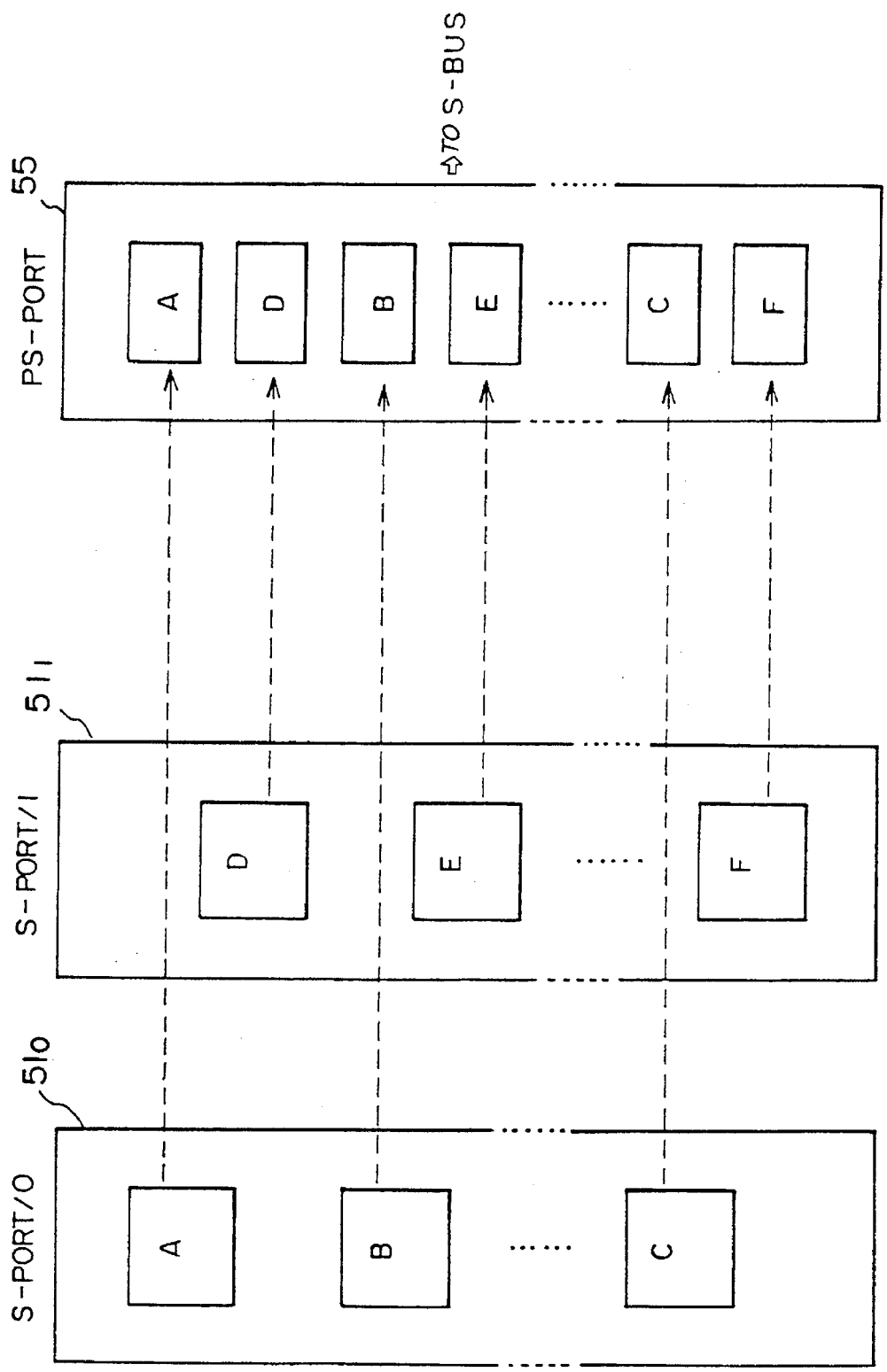
FIG. 18 is a block diagram of a physical transmitting port switching process.

FIG. 18 shows an example of the switching process of the PS-PORT 55. The PS-PORT 55 first transmits the message of the entry A of the logical transmitting port (S-PORT) $51_0$ having the number 0, and then transmits the message of the entry D of the logical transmitting port (S-PORT) $51_1$ having the number 1. Thereafter, the PS-PORT 55 transmits the message of the entry B of the S-PORT $51_0$, next transmits the message of the entry E of the S-PORT $51_1$, and similarly carries out the process of alternately switching the output message of the S-PORTs $51_0$ and $51_1$.

Accordingly, when the two S-PORTs $51_0$ and $51_1$ are activated, a process is carried out so as to execute the transmission process of the two S-PORTs $51_0$ and $51_1$ to which the activation request is made. The PS-PORT 55 is disconnected from the R-PORT 53 at the communication destination for every transfer block depending on the protocol of the common system bus 32. By the control process of the MSC 62, a process is carried out so as not to connect to the SPORT $51_0$ or $51_1$ to the PS-PORT 55 until the transmission of all the message of one entry is completed.

The PR-PORT 56 of each connection unit 43 notifies the start of the reception to the MSC 62 when the message block is received. When this notification is received, the MSC 62 first identifies the connection unit 43 which is the transmitting source. Further, if the communication mode is the ANY mode and no R-PORT 53 has the logical connection relationship to the identified connection unit 43, the MSC 62 carries out a control so as to receive the message block by the R-PORT which matches the level of the transmitted message block.

The message block which is received in this case must be the F block or the S block, and this logical connection continues as a normal one if the received message block is the F block or the S block. On the other hand, if the received message block is the M block or the L block, some kind of protocol error exists, and the MSC 62 notifies this to the connection unit 43 at the transmitting source via the PR-PORT 56 and the transmission control unit (SNDC) 59, and does not connect to any of the R-PORTs 53 which can make a reception. In addition, if there does not exist any R-PORT 53 which can make a reception, this is notified to the connection unit 43 at the transmitting source.

On the other hand, if the communication mode is the ANY mode and the logical connection relationship exists between one of the R-PORTs 53 and the identified connection unit 43, the MSC 62 carries out a control so as to receive the message by this R-PORT 53. The message block which is received in this case must be the M block or the L block, and thus, this logical connection is continued as a normal one if the received message block is the M block and the logical connection is ended as a normal one if the received message block is the L block.

But if the received message block is the F block or the S block, some kind of protocol error exists, and the MSC 62 transmits this to the connection unit 43 at the transmitting source via the PR-PORT 56 and the SNDC 59, and an abnormal end is made of the received R-PORT 53.

If the communication mode is the SPC mode, one of the R-PORTs 53 is prepared to receive the message block from the connection unit 43 at the transmitting source, and thus, the MSC 62 carries out a control so as to receive the message block by this R-PORT 53. In the SPC mode, similarly as in the case of the ANY mode, the first block is the F block or the S block, and the block ends with the L block after a succession of the M blocks. In the case of the SPC mode, a temporary interruption is generated in the message, which is transmitted, depending on the renewal of the entry at the transmitting and receiving sides and the alternating process by the PS-PORT 55 in entry units caused thereby. In the SPC mode, it is also not permitted to have a plurality of logical connection relationships at the same time between the plurality of S-PORTs 51 of the same connection unit 43.

Normally, the transfer blocks of the message from the S-PORT 51 of other connection units 43 are transferred to the PR-PORT 56 of each connection unit 43. For this reason, the SMC 62 of each connection unit 43 must distribute the transfer block which is transferred to the R-PORTs 53 of its connection unit 43.

This distributing process is executed in units of transfer blocks, which are the input unit, while referring to the logical connection information managed by the R-PORT 53. The plurality of R-PORTs 53 of each connection unit 43 accurately receive the series of messages depending on the distribution process of this MSC 62.

Figure 19:
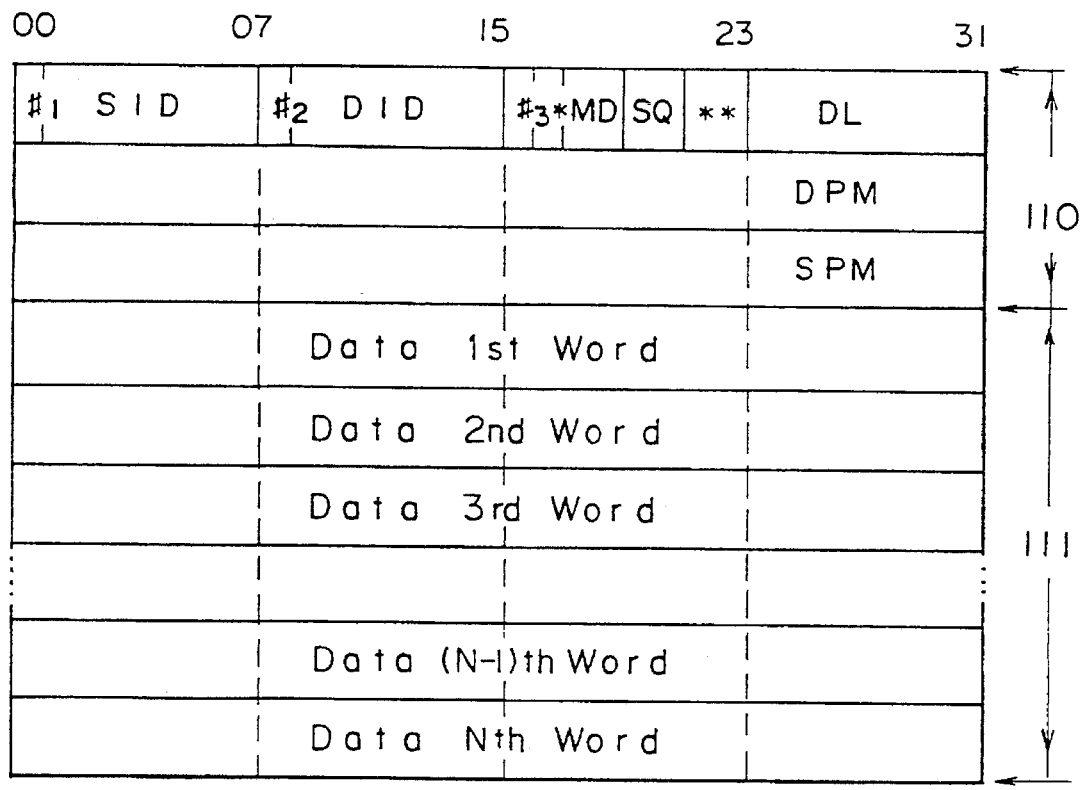
FIG. 19 is a diagram showing an example of the data format of a message block on a system bus.

Logical connection information is inserted in the header part of the command block (message). FIG. 19 shows an example of the format of the message block on the system bus 32. As shown in this figure, the message block is made up of a header part 110 and a data part 111. The data part 111 is made up of N words of data, where one word is made up of 4 bytes.

The 3 bits #1 to #3 within the header part 110 indicates the kind of transfer block, and indicates the message block when set to "010". In addition, SID and DID respectively indicate the source identifier and the destination identifier. The source identifier SID is an ID on the system bus of the transmission bus controller of the transfer block, and indicates the connection unit 43 of the transmission processing module in the case where the transfer block is the message block. The destination identifier DID is an ID on the system bus of the reception bus controller of the transfer block, and indicates the connection unit 43 of the reception processing module in the case where the transfer block is the message block. In addition, MD is a 2-bit identifier which indicates whether the mode is the ANY mode or the SPC mode, and indicates the ANY 0 mode if set to "00", the ANY 1 mode if set to "01" and the SPC mode if set to "10". SQ is a 2-bit block identifier and indicates the S block if "00", the F block if "01", the M block if "10" and the L block if "11". The buffer 90 within the MSC 62 (shown in FIG. 9) stores the identifiers MD and SQ, and compares them in the comparator 96 with the signal from the generator 85 indicating whether the F block or the M block is waited.

In addition, in FIG. 19, DL indicates the block length (length of data part 111) of the message block. DPM is a reception processing module ID of the message, and is normally identical to the DID. SPM is a transmission processing module ID of the message, and is normally identical to the above SID.

Figure 20:
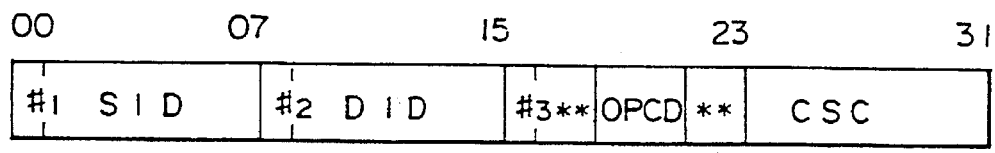
FIG. 20 is a diagram showing an example of the data format of a status block on the system bus.

The status block on the system bus 32 indicating the process result of the received message has a format as shown in FIG. 20. In this figure, the 3 bits #1 to #3 indicates the kind of transfer block, and the status block is indicated if they are set to "111". In addition, the source identifier SID is an ID, on the system bus 32, of the transmission bus controller of the transfer block, and indicates the connection unit 43 of the reception processing module in the case of the status with respect to the message block, contrary to the SID of the message block.

The destination identifier DID is an ID, on the system bus 32, of the reception bus controller of the transfer block, and indicates the connection unit 43 of the transmission processing module in the case of the status with respect to the message block. The 3-bit identifier OPCD indicates the transfer block to which the status belongs, and is the status block with respect to the message block if it is set to "010" Further, the code CSC indicates the process result within the reception processing module with respect to the transferred message block.

Next, a description will be given of an example of the distribution process of the PR-PORT 56 by referring to FIG. 21. The message blocks $A_F$, $B_F$, $C_F$, $A_{M1}$, $B_{M1}$, $C_{M1}$, . . are alternately input to the number 0 PR-PORT $56_0$ and the number 1 PR-PORT $56_1$. The letters A, B, C and the like indicates the kind of message block, that is, examples of the connection units 43 of the message transmission processing module. In addition, the subscripts F, M and L indicate the above F block, M block and L block.

The MSC 62 distributes the transfer block $A_F$ which is transferred first to the number 0 P-PORT $53_0$ based on the SID and SPM of FIG. 19. Next, the transfer block $B_F$ transferred from the PR-PORT $56_1$ is distributed to the number 1 R-PORT $53_1$. Similarly, the transfer block $C_F$ transferred from the PR-PORT $56_0$ is distributed to the number 2 R-PORT $53_2$, and the transfer block $A_{M1}$ is transferred from the PR-PORT $56_1$ to the number 0 R-PORT $53_0$.

Figure 21:
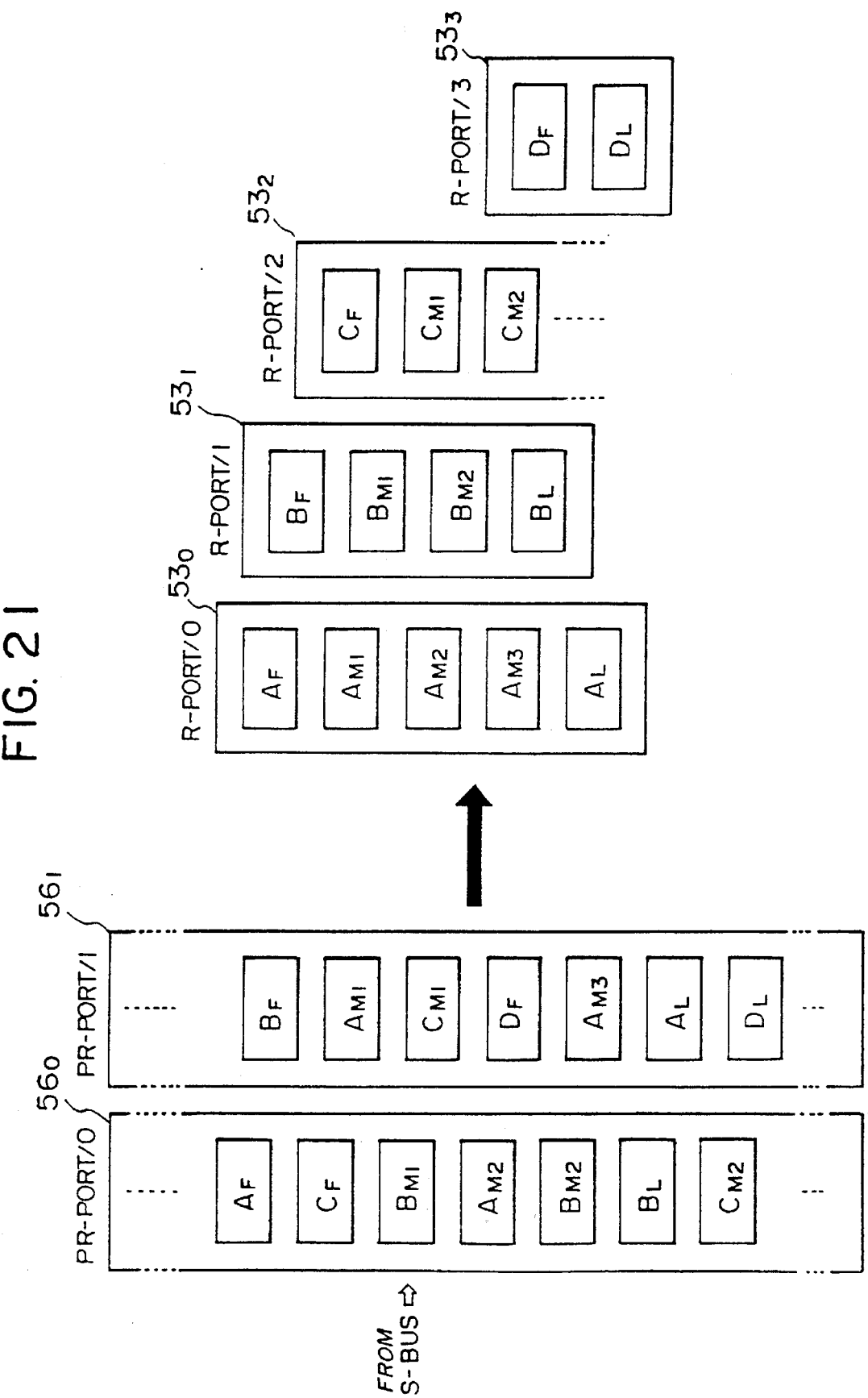
FIG. 21 is a diagram of a physical receiving port distributing process.

Accordingly, the messages are transferred to the R-PORTs $53_0$ to $53_3$ in sequence for every message control as shown in FIG. 21, and it is possible to execute an accurate reception process of the message.

Next, a detailed description will be given of the fault processing.

The abnormalities which may be generated during the series of message communication processes of the present invention can roughly be categorized into a hardware error within the transmitting side processing module 30, the hardware error within the receiving side processing module 30, a hardware error during the transfer on the common system bus 32, and a software error of the receiving side processing module 30 including the flow control disturbance and the like.

Abnormality detection is carried out at various parts of the transmitting side connection unit 43, the common system bus 32 and the receiving side connection unit 43. Normally, before the logical connection between the transmitting side and the receiving side starts, an abnormality triggered and started by the start of the operation of the transmitting side is indicated only to the software of the transmitting side processing module 30. In addition, an abnormality caused by the receiving operation is indicated only to the software of the receiving side processing module 30.

After the logical connection between the transmitting side and the receiving side is generated, it is necessary to promptly release the logical connection state when some kind of fault is generated. For example, if the logical connection state is released only on the transmitting side and not on the receiving side, there is a possibility that the receiving side R-PORT 53 may hang up. In order to avoid such a situation, a hardware function is provided to release both logical connection states as much as possible. If the release is not possible by use of said hardware function alone, there is provided a hardware function which cooperates with the software to release the logical connection states.

The faults which may be generated during the logical connection may be categorized into the following 5 kinds. The common system bus 32 in this case employs the split type, and the message communication includes the transfer of the message block having the data format shown in FIG. 19 from the transmitting side to the receiving side, and the transfer of the status block having the data format shown in FIG. 20 from the receiving side to the transmitting side. The series of logical messages are completed by repeating the message transfer and the status transfer with respect thereto a plurality of times. The 5 kinds of faults are:

1) Fault which is detected during a message transfer on the common system bus 32;

2) Fault which is detected during a status transfer on the common system bus 32;

3) Fault which is detected during an internal process (storage process to the LSU 42 and the like) of the receiving side processing module 30;

4) Fault which is detected during an internal process (read out process from the LSU 42 and the like) of the transmitting side processing module 30; and 5) Heavy fault generated in the transmitting side processing module 30.

In the case of fault types 1) and 4), the error is notified to the transmitting side processing module 30. Responsive to this notification, the connection unit 43 of the transmitting side processing module 30 releases the logical connection state and notifies this to the software which runs on the central processing unit 41 by an external interrupt.

In response to this notification, the software reads out the end state information CSC which is written in the SPCST register of the control register 52 described in conjunction with FIG. 12, and retransmits the same message to the receiving side processing module 30 according to this detection result. This is because the fault is generated during the message transfer on the common system bus 32 and the logical connection state may still be continued at the receiving side processing module 30.

Responsive to this retransmission, the connection unit 43 of the receiving side processing module 30 detects a protocol violation because the message of the F block is transmitted from the same processing module 30 when the M block or the L block is waited because it is in the logical connection state. Hence, the connection unit 43 releases the logical connection state in accordance therewith, and notifies this to the software which runs on the central processing unit 41 by an external interrupt. By this fault processing, it is possible to release the logical connection state on both the transmitting and receiving sides.

In the case of fault type 2), the error is notified to the receiving side processing module 30. Responsive to this notification, the connection unit 43 of the receiving side processing module 30 releases the logical connection state, and notifies this to the software which runs on the central processing unit 41 by an external interrupt. In this state, the connection unit 43 of the transmitting side processing module 30 anticipates a status transfer and operates a timer for anticipating the status transfer.

If the status transfer has not been received after a constant time elapses, the logical connection state is released by detecting the time out, and an external interrupt is used to notify this to the software which runs on the central processing unit 41. By this fault processing, it is possible to release the logical connection state on both the transmitting and receiving sides.

When fault type 3) is detected and the generation time of this fault is before the status transmission, the connection unit 43 of the receiving side processing module 30 signals the fault generation to the transmitting side processing module 30 by the status transfer, releases the logical connection state, and further, signals this to the software running on the central processing unit 41 by an external interrupt. The transmitting side processing module 30 makes an abnormal end upon receipt of the status notifying the fault generation, and notifies this to the software running on the central processing unit 41 by an external interrupt. By this fault processing, it is possible to release the logical connection state on both the transmitting side and receiving sides.

On the other hand, in the case where the fault generation cannot be notified to the transmitting side processing module 30 by the status transfer due to the generation time of the fault being after the status transfer and the like, the connection unit 43 of the receiving side processing unit 30 releases the logical connection and notifies this to the software running on the central processing unit 41 by an external interrupt. The connection unit 43 of the receiving side processing module 30 is re-started according to the processing of the software which receives this notification, and the F block/S block from the transmitting side processing module 30 is waited. In this state, since the M block or the L block is transmitted from the transmitting side processing module 30, the connection unit 43 of the receiving side processing module 30 signals the fault generation to the transmitting side processing module 30 by the status transfer.

When this notification is received, the connection unit 43 of the transmitting side processing module 30 releases the logical connection state and notifies this to the software which runs on the central processing unit 41 by an external interrupt. By this fault processing, it is possible to release the logical connection state on both the transmitting and receiving sides.

In the case of a fault type 5, the receiving side processing module 30 hangs up in the logical connection state because the transmitting side processing module 30 is in the stopped state. In order to save this hang up, the software which runs on the central processing unit 41 of the receiving side processing module 30 periodically polls the indication information of the RPOPS register of the control register 54, which was described in conjunction with FIG. 13, and is provided so as to indicate the operating state of the R-PORT 53. By this polling, it is detected whether the logical connection state is continued for over a predetermined constant time.

The release of the logical connection state is indicated by writing a forced end indication during operation into the RPFCP register of the control register 54, described in conjunction with FIG. 13. By this fault processing, it is possible to eliminate the hang up of the logical connection state of the receiving side processing module 30 caused by the heavy fault of the transmitting side processing module 30.

Next, a description will be given of the end interface between the hardware and software.

The software, which runs on the central processing unit 41, can recognize the progress situation of the processing of each entry of the descriptor chain by the following three means.

First, the indication data of the control register 52 belonging to each S-PORT 51 is monitored, and the indication data of the control register 54 belonging to each R-PORT 53 is monitored. The address information in the local storage unit 42 of the entry of the descriptor being processed is written into the SPOPS register and the RPOPS register of these control registers 52 and 53 as described above, and the software can be aware of the progress situation of the processing by monitoring such.

Second, when "1" is set in the D bit, an external interrupt is made with respect to the software at the time when the processing of this descriptor is completed. Hence, the software can be aware of the progress situation of the processing by this external interrupt.

These two methods are used when the processing of each entry of the descriptor chain is progressing normally. In this case, although the entry of the descriptor of the S-PORT 51 remains the same, a content dependent on the received message is written into the entry of the descriptor of the R-PORT 53.

In other words, in the ANY mode, the received message size is written in the BCT information field of each entry, the next address of the last data is written in the BUFA information field, and the unit number of the connection unit 43 of the processing module 30 at the transmitting source is written in the UID information field. On the other hand, in the SPC mode, only the BUFA information field and the UID information field are rewritten. The software of the receiving side processing module 30 can recognize the message size and the transmitting source based on this information. When the last entry of the descriptor chain is completed, the connection unit 43 generates an external interrupt with respect to the software regardless of the D bit.

As the third means for being aware of the progress situation of the processing, an external interrupt is generated with respect to the software when the abnormality of the process is detected, and the end information describing the content of the abnormality is written into the SPCST register and the RPCST register of the control registers 52 and 54. Hence, the software can be aware of the progress situation of the processing only from this external interrupt, and can be aware of the details of the abnormality content by referring to this end information. The software recognizes the entry in which the abnormality is generated according to the SPOPS register and the RPOPS register of the control registers 52 and 54.

Even in the case where the processing of all entries of the descriptor, which is prepared in advance, ends normally, an external interrupt is similarly generated with respect to the software. In this case, end information indicating the normal end is indicated by the SPCST register and the RPCST register.

The software which runs on the central processing unit 41 includes means for indicating the end of the processing of each S-PORT 51 and each R-PORT 53 during the processing of the descriptor chain. In other words, by writing the indication of the forced end to the SPFCP register of the control register of the S-PORT 51, the software indicates the forced end of the processing of an S-PORT 51. On the other hand, by writing the indication of the forced end to the RPFCP register of the control register 54 of the R-PORT 53, the software indicates the forced end of the processing of an S-PORT 51.

When indicating the end, there are two kinds of forced end modes. One forced end mode indicates a forced end after the processing of the entry which is presently being processed is completed. The other forced end mode indicates an immediate forced end (however, if during reception of the transfer block, the forced end is indicated after completion thereof) regardless of the entry processing state.

When the software indicates the forced end of the processing of the S-PORT 51, the software sets a flag in the "N" region of the SPFCP register of the control register 52 shown in FIG. 12 if executing the forced end according to the former mode. On the other hand, when executing the forced end according to the latter mode, the software sets a flag in the "I" region of the SPFCP register.

In addition, when indicating the forced end of the processing of the R-PORT 53, a flag is set in the "N" region of the RPFCP register of the control register 54 (shown in FIG. 13) if executing the forced end according to the former mode. On the other hand, when executing the forced end according to the latter mode, a flag is set in the "I" region of the RPFCP register.

When the indication of the forced end according to the former mode is written in the SPFCP register and the RPFCP register of the control registers 52 and 54 by the software, the MSC 62 executes the forced end process at the time when the completion of the processing of the entry being processed is confirmed by monitoring the progress situation of the processing of the S-PORT 51 and the R-PORT 53.

On the other hand, when the indication of the forced end according to the latter mode is written, the MSC 62 executes the forced end process immediately after completion of the transmission and reception if the transmission and reception are being made, without monitoring the progress situation of the processing of the S-PORT 51 and the R-PORT 53. In other words, the processing state of the S-PORT 51 is forcibly set to the "C State", as described above, and the processing state of the R-PORT 53 is forcibly set to the "C State", as described above.

Next, a detailed description will be given of the operation process of the S-PORT 51.

Figure 22:
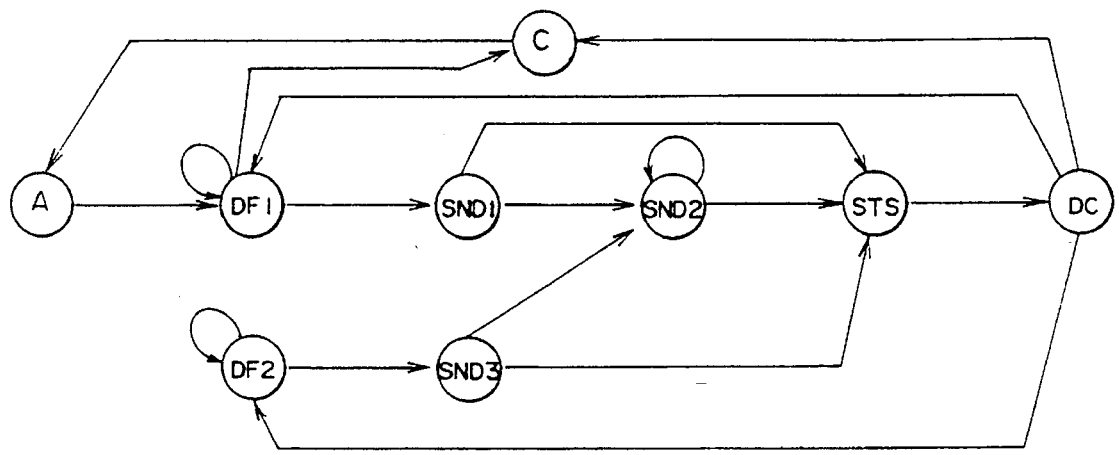
FIG. 22 is a state transition diagram of an embodiment of a logical transmitting port.

The series of transmitting operations according to the indication of the software running on the central processing unit 41 is managed by the S-PORT 51. This S-PORT 51 executes the message transmitting process according to the operation indication to the MSC 62, [and] the operation indication to the DMAC 58 and the PS-PORT 55 via the MSC 62. FIG. 22 shows a state transition diagram of the process executed by the S-PORT 51. The operation condition of each state of this S-PORT 51 is indicated below.

The A State waits for the operation indication from the software. A state transition is made to the DF1 state by the write access of the communication mode of the control register 52 with respect to the PODF register.

The DF1 State is a descriptor fetch operation state. By the MSC 62 and the DMAC 58 and according to the address state indicated by the SPCSA register of the control register 52, one entry of the descriptor chain is loaded from the local storage unit 42 to the work region for the logical transmitting port within the dual port RAM 61 to make a state transition to the SND1 state. If the BC bits of the loaded entry indicates the branching, the DF1 state is maintained, and the SPDSA register of the control register 52 is rewritten to the branch address.

In the SND1 State the transfer block of the first message is fetched from the logical buffer specified by the loaded entry, and a transmission request is issued with respect to the PS-PORT 55. The transfer block which is fetched is stored in the holding buffer of the logical transmitting port provided within the dual port RAM 61. In this case, the block which is transferred is assigned the identifier F or S depending on its block size. If the identifier F is assigned, a state transition to the SND2 state occurs, and a state transition to the STS state occurs if the identifier S is assigned.

In the SND2 State, correspondence with the common system bus 32 employing the split bus system, the answer with respect to the transferred block is waited, and at the same time, the next transfer block is fetched after receipt of the answer, and the transmission request is issued with respect to the PS-PORT 55. In this case, the identifier M or L is assigned to the block which is transferred. The SND2 state is held if the identifier is M is assigned, and a state transition is made to the STS state if the identifier L is assigned.

The STS state waits for the answer with respect the block which is transferred last. A state transition is made to the DC state after receipt of the answer.

In the DC State, in order to move the processing entry to the next, the SPDSA register of the control register 52 is renewed (16 byte addition). When the continuation of the descriptor is indicated by the BC bits of the entry for which the process is completed, a state transition is made to the DF1 state if the communication mode is the ANY mode and a state transition is made to the DF2 state if the communication mode is the SPC mode. On the other hand, if no continuation is indicated by the BC bits, a state transition is made to the C state.

The DF2 State is the same as the DF1 state excluding the state transition to the SND3 state after completion.

In the SND3 State the first transfer block is fetched from the logical buffer specified by the loaded entry, so as to issue the transmission request with respect to the PS-PORT 55. The transfer block which is fetched is stored in the holding buffer for the logical transmitting port provided within the dual port RAM 61. Although the entry has been changed, the identifier M or L is assigned to the block which is transferred in correspondence with the SPC mode. A state transition is made to the SND2 state if the identifier M is assigned, and a state transition is made to the STS state if the identifier L is assigned.

The C State is a state in which the series of transfer operations at the S-PORT 51 is ended. A state transition is made to this state also in the case of an abnormal end when various abnormalities are detected at each of the states. A state transition is made to the A state if the fetch operation with respect to the SPCST register (written within the end information) of the control register 52 is executed by the software.

Next, a detailed description will be given of the operation process of the R-PORT 53.

The series of receiving operations according to the indication of the software running on the central processing unit 41 is managed by the R-PORT 53. The R-PORT 53 executes the message transmission process depending on the operation indication to the MSC 62, the operation indication to the DMAC 58 and the PR-PORT 56 via the MSC 62.

Figure 23:
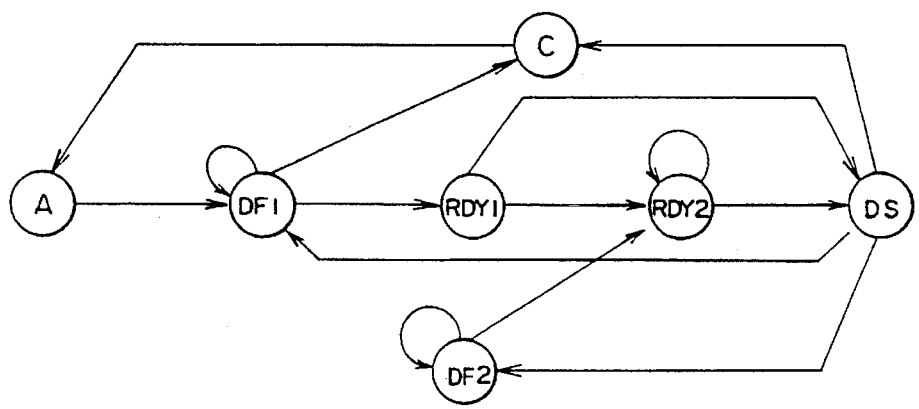
FIG. 23 is a state transition diagram of an embodiment of a logical receiving port.

FIG. 23 shows a state transition diagram of the process executed by this R-PORT 53. The operating conditions at each state of this R-PORT 53 is indicated below.

The A State is a state in which the operation indication from the software is waited. A state transition is made to the DF1 state by the write access of the operation mode with respect to the RPODF register of the control register 54.

The DF State is a descriptor fetch operation state. One entry of the descriptor chain is loaded, by the MSC 62 or DMAC 58, to the work region for the logical receiving port, within the dual port RAM 61 from the logical storage unit 42 depending on the address information specified by the RPDSA register of the control register 54, and a state transition is made to the RDY1 state.

If the BC bits of the loaded entry indicates branching, the DF1 state is maintained, and the RPDSA register of the control register 54 is rewritten to the branch address.

The RDY1 State is a state in which the receipt of the transfer block of the first message to the loaded entry is waited. If the identifier of the received transfer block is F or S, the PR-PORT 56 specifies the R-PORT in the matching communication mode out of the R-PORTs 53 in the RDY1 state, and executes a logical connection between this specified R-PORT.

When this logical connection is realized, this R-PORT stores the transfer block, which is stored in the holding buffer for the logical receiving port provided within the dual port RAM 61, into the logical buffer which is specified by the loaded entry.

After this store process is completed, and if the identifier of the received transfer block is F, an answer transmission request is issued to the common system bus 32 to make a state transition to the RDY2 state. If the identifier of the received transfer block is S, a state transition is made to the DS state by holding the answer transmission request to the common system bus 32. If the communication mode is the SPC mode and the block cannot be stored in its entirety into the specified logical buffer, a state transition is made to the DS state during the store operation, and in this case, the answer transmission request to the common system bus 32 is also held.

The RDY2 State is a state of waiting for the receipt of the next transfer block, where the R-PORT 53 already has the logical connection relationship to the S-PORT 51 of another processing module 30. If the identifier of the received transfer block is M or L, the PR-PORT 56 specifies the R-PORT which is to receive out of the R-PORTs 53 in the RDY2 state, and executes a logical connection between this specified R-PORT.

When this logical connection is realized, this R-PORT stores the transfer body, which is stored in the holding buffer for the logical receiving port provided within the dual port RAM 61 into, the logical buffer which is specified by the loaded entry. After the store process is completed and when the identifier of the received transfer block is M, the RDY2 state is held by issuing the answer transmission request to the common system bus 32. If the identifier of the received transfer block is L, the answer transmission request to the common system bus 32 is held and a state transition is made to the DS state.

If the communication mode is the SPC mode and the block cannot be stored in its entirety into the specific logical buffer, a state transition is made to the DS state during the store operation, and in this case, the answer transmission request to the common system bus 32 is also held.

The DS State is a state of writing the processing situation into an entry after processing of the loaded entry is completed. The information is written into the BCT information field, the UID information field and the like of the entry. Further, the RPDSA register of the control register 54 is renewed (16 byte addition) so as to move the processing entry to the next. If the communication mode is the ANY mode, the answer transmission request to the common system bus 32, held in the RDY1 state or the RDY2 state, is issued.

When the continuation of the descriptor is indicated by the BC bits of the entry the processing of which is completed, a state transition is made to the DF1 mode if the communication mode is the ANY mode, and a state transition is made to the DF2 mode if the communication mode is the SPC mode. On the other hand, a state transition is made to the C state if no continuation is indicated by the BC bits.

In DF2 State, the second and subsequent entries are fetched if the communication mode is the SPC mode, and if necessary, the answer transmission request to the common system bus 32 held in the RDY1 state or the RDY2 state is issued. The rest of the operation is otherwise the same as that for the DF1 state.

The C State is a state in which the series of transfer operations at the R-PORT 53 are ended. A state transition is also made to this state also in the case of the abnormal end when various abnormalities are detected in each state. For example, if the MSC 62 detects the transfer of the message of the F block in the RDY2 state of the R-PORT 53, the state of this R-PORT 53 is changed to the C state. A state transition is made to the A state when the fetch operation is executed by the software with respect to the RPCST register (written with end information) of the control register 54.

The construction and operation of the physical transmitting port (PS-PORT) 55, the physical receiving port (PR-PORT) 56, the access control unit (BSC) 57, the memory access control unit (DMAC) 58, the transmission control unit (SNDC) 59, the reception control unit (RCVC) 60 and the main sequence control unit (MSC) 62 which are other constituent units of the connection unit 43 differ depending on the PM internal bus 44 and the common system bus 32 which are actually used. The MSC 57 and the DMAC 58 are dependent on the PM internal bus 44, the PS-PORT 55 and the PR-PORT 56 are dependent on the common system bus 32, and the MSC 62 is dependent on the implement.

Therefore, according to this embodiment, the transmitting side processing module 30 can transmit a large amount of messages to processing modules 30 at a plurality of communication destinations with a small overhead, by specifying the SPC mode.

As described above, when making the message communication among a plurality of processing modules forming a loosely coupled multiprocessing system in the message control system for data communication system according to the present invention, it is possible to transmit a large message at one time with a small overhead, without requiring the buffers within the processing modules at the transmitting and receiving sides to match, and the system is thus suited for use in a large scale data communication system.

We claim:

1. A data communication system comprising:

a system bus; and a plurality of processing modules connected to each other via said system bus, said processing modules each including:

a central processing unit;

a memory unit, accessible by said central processing unit, including:

a data processing part for causing the central processing unit to perform a predetermined function dependant on the content of a message;

a buffer forming a storage region and in which a transmitting message is decomposed and stored; and a descriptor storage location for managing at least one descriptor which contains address and data length information of the storage region for a message in the form of a chain; and a connection unit, forming an interface between said memory unit and said system bus, including:

a logical transmitting port with associated physical transmitting port for controlling message transmission to other processing modules by successively reading a message from the buffer based on the information stored in the descriptor and transmitting the message as a continuous message; and a logical receiving port with associated physical receiving port for controlling message reception from other processing modules by receiving and successively storing the message transmitted thereto having that processing module as a destination based on the information stored in the descriptor;

an access control unit for interfacing with said central processing unit and said memory unit in said processing module;

a memory access control unit for accessing the memory unit;

a transmission control unit for processing an interface of a transmission process with the system bus;

a reception control unit for processing an interface of a reception process with said system bus;

a main sequence control unit for controlling said connection unit; and a memory coupled to said main sequence control unit to provide a work area for said main sequence control unit.

2. A data communication system comprising:

a system bus; and a plurality of processing modules connected to each other via said system bus, said processing modules each including:

a central processing unit;

a memory unit, accessible by said central processing unit, including:

a data processing part for causing the central processing unit to perform a predetermined function dependant on the content of a message;

a buffer forming a storage region and in which a transmitting message is decomposed and stored; and a descriptor storage location for managing at least one descriptor which contains address and data length information of the storage region for a message in the form of a chain, wherein the descriptor has a plurality of entries, the entries describing address information and size information of the buffer in the memory unit arranged in one of a sequential and a branching format, and one of said entries being a head entry pointed to by address information set in a control register within one of the transmitting port and the receiving port;

a connection unit, forming an interface between said memory unit and said system bus, including:

a transmitting port, connected to said system bus, successively reading a message from the buffer based on the information stored in the descriptor and transmitting the message as a continuous message; and a receiving port, connected to said system bus, receiving and successively storing the message transmitted thereto having that processing module as a destination based on the information stored in the descriptor.

3. The data communication system as claimed in claim 2, wherein each entry of the descriptor includes bits for specifying a processing method after processing of the entry ends, an interrupt specifying bit, size information of the buffer in accordance with a communication mode, a head address of the buffer treated by the entry, and a unit number of the processing module at one of a transmitting source and transmitting destination.

4. The data communication system as claimed in claim 3, wherein the data communication system operates in one of at least two communication modes, the communication mode being one of a first mode in which a message in the buffer specified by each entry of the descriptor is treated as a message forming one transfer one unit and is transmitted to the processing module at the transmitting destination, and a second mode in which all of the messages in the buffer specified by the entries connected by a descriptor chain are treated as one transfer unit and directly transferred to the buffer of the processing module at the transmitting destination by obtaining in advance an agreement between the transmitting side processing module and the receiving side processing module.

5. A data communication system comprising:

a system bus; and a plurality of processing modules connected to each other via said system bus, said processing modules each including:

a central processing unit;

a memory unit, accessible by said central processing unit, including:

a data processing part for causing the central processing unit to perform a predetermined function dependant on the content of a message;

a buffer forming a storage region and in which a transmitting message is decomposed and stored; and a descriptor storage location for managing at least one descriptor which contains address and data length information of the storage region for a message in the form of a chain, the descriptor being generated based on information regarding message length received from a processing module which originated the message; and a connection unit, forming an interface between said memory unit and said system bus, including:

a transmitting port, connected to said system bus, successively reading a message from the buffer based on the information stored in the descriptor and transmitting the message as a continuous message; and a receiving port, connected to said system bus, receiving and successively storing the message transmitted thereto having that processing module as a destination based on the information stored in the descriptor, wherein the data processing part arranges the descriptor in the memory unit and writes address information of a first descriptor with which control starts into a first control register within the transmitting port when activating the transmitting port and writes address information of the first descriptor with which control starts into a second control register within the receiving port when activating the receiving port, and the connection unit writes address information of the descriptor which is being processed into the first control register within the transmitting port at the time of a transmission and into the second control register within the receiving port at the time of a reception.

6. A data communication system for messages of variable lengths in a data communication system comprising:

a system bus; and a plurality of processing modules connected to each other via said system bus said processing modules including:

a central processing unit;

a memory unit, accessible by said central processing unit including:

a data processing part for causing the central processing unit to perform a predetermined function dependant on the content of a message;

a buffer forming a storage region and in which a transmitting message is expanded and stored; and a descriptor storage location for managing at least one descriptor which contains address and data length information of the storage region for a message in the form of a chain; and a connection unit of the processing module, forming an interface between said memory unit and said system bus, including:

a transmitting port, connected to said system bus, successively reading a message from the buffer based on the information stored in the descriptor and transmitting the message as a continuous message;

a receiving port, connected to said system bus, receiving and successively storing the message transmitted thereto having that processing module as a destination based on the information stored in the descriptor; and abnormality detecting means for detecting whether an abnormality exists with respect to a received message by detecting whether the length of the message received up to that point matches a message length information which is sent from a transmitting side processing module when said receiving port completes a message reception.

7. The data communication system as claimed in claim 6, wherein the data processing part at the time of a message transmission generates the descriptor in the memory unit and generates the message length information.

8. The data communication system as claimed in claim 6, wherein the data processing part at the time of a message reception reserves a storage region in the memory unit with a length identical to the message length information sent by the data processing part of the transmitting side processing module and with a form suited for its processing based on the message length information, and said data processing parts generates the descriptor in the memory unit.

9. The data communication system as claimed in claim 6, wherein the transmitting port reads out the message from the buffer in a sequence pointed by the descriptor and transmits the message by adding an identifier to the message which specifies the use of the buffer.

10. The data communication system as claimed in claim 6, wherein the connection unit comprises:

a logical transmitting port with associated physical transmitting port for controlling message transmission to other processing modules;

a logical receiving port with associated physical receiving port for controlling message reception from other processing modules;

an access control unit for interfacing with said central processing unit and said memory unit in said processing module;

a memory access control unit for accessing the memory unit;

a transmission control unit for processing an interface of a transmission process with the system bus;

a reception control unit for processing an interface of a reception process with said system bus;

a main sequence control unit for managing the control of the entire connection unit; and a memory which is used as a work area for said main sequence control unit.

11. The data communication system as claimed in claim 6, wherein the descriptor has a plurality of entries, the entries describing address information and size information of the buffer in the memory unit arranged in one of a sequential and a branching format and one of said entries being a head entry pointed to by address information set in a control register within one of the transmitting port and the receiving port.

12. The data communication system as claimed in claim 11, wherein each entry of the descriptor includes bits for specifying a processing method after processing of the entry ends, an interrupt specifying bit, size information of the buffer in accordance with a communication mode, a head address of the buffer treated by the entry, and a unit number of the processing module at one of a transmitting source and transmitting destination.

13. The data communication system as claimed in claim 12, wherein the data communication system operates in one of at least two communication modes, the communication mode is one of a first mode in which the message in the buffer specified by each entry of the descriptor is treated as a message forming one transfer unit and transmitted to the processing module at the transmitting destination, and a second mode in which all of the messages as a whole in the buffer specified by the entries connected by a descriptor chain are treated as one transfer unit and directly transferred to the buffer of the processing module at the transmitting destination by obtaining in advance an agreement between the transmitting side processing module and the receiving side processing module.

14. The data communication system as claimed in claim 6, wherein the data processing part after arranging the descriptor in the memory unit writes address information of a first descriptor with which control starts into a first control register within the transmitting port when activating the transmitting port and writes address information of the first descriptor with which control starts into a second control register within the receiving port when activating the receiving port, and the connection unit writes address information of the descriptor which is being processed into the first control register within the transmitting port at the time of a transmission and into the second control register within the receiving port at the time of a reception.

15. The data communication system as claimed in claim 6, wherein the data communication system is a loosely coupled multiprocessing system.

* * * * *

UNITED STATES PATENT AND TRADEMARK OFFICE
CERTIFICATE OF CORRECTION

PATENT NO. : 5,592,624
DATED : January 7, 1997
INVENTOR(S) : Hajime TAKAHASHI, et al.

It is certified that error appears in the above-indentified patent and that said Letters Patent is hereby corrected as shown below:

Column 25, line 29, change "dependant" to -- dependent --.

Column 26:
    Line 9, change "dependant" to -- dependent --.
    Line 66, change "dependant" to -- dependent --.

Column 27:
    Line 39, after "bus", insert -- , -- (comma).
    Line 45, change "dependant" to -- dependent --.

Column 28, line 48, after "format", insert -- , -- (comma).

Signed and Sealed this

Third Day of June, 1997

BRUCE LEHMAN

Attest:

Attesting Officer

Commissioner of Patents and Trademarks